(12) United States Patent
Pope et al.

(10) Patent No.: US 7,656,395 B2
(45) Date of Patent: Feb. 2, 2010

(54) METHODS AND APPARATUSES FOR COMPOUND TRACKING SYSTEMS

(75) Inventors: Jeremiah Pope, Kirkland, WA (US);
Rajeev Badyal, Fort Collins, CO (US);
Glen Larsen, Issaquah, WA (US);
Thomas C. Oliver, Windsor, CO (US);
Randall T. Crane, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 10/891,484

(22) Filed: Jul. 15, 2004

(65) Prior Publication Data

US 2006/0012562 A1    Jan. 19, 2006

(51) Int. Cl.
*G06F 3/033* (2006.01)
(52) U.S. Cl. .................................. 345/179; 345/163
(58) Field of Classification Search .................. 345/166, 345/156, 157, 162, 163, 179; 178/18.09, 178/19.01–19.05; 382/313–314
See application file for complete search history.

(56) References Cited

U.S. PATENT DOCUMENTS

| | | | |
|---|---|---|---|
| 4,794,384 A | 12/1988 | Jackson | |
| 5,442,147 A | 8/1995 | Burns et al. | |
| 5,578,813 A | 11/1996 | Allen et al. | |
| 5,644,139 A | 7/1997 | Allen et al. | |
| 5,652,412 A * | 7/1997 | Lazzouni et al. | 178/18.01 |
| 5,675,129 A | 10/1997 | Burns et al. | |
| 5,825,044 A | 10/1998 | Allen et al. | |
| 6,992,655 B2 * | 1/2006 | Ericson et al. | 345/163 |
| 7,009,594 B2 | 3/2006 | Wang | |
| 7,154,477 B1 * | 12/2006 | Hotelling et al. | 345/166 |
| 2004/0135776 A1 * | 7/2004 | Brouhon | 345/179 |

FOREIGN PATENT DOCUMENTS

WO    WO 00/31682    6/2000

* cited by examiner

*Primary Examiner*—Chanh Nguyen
*Assistant Examiner*—Pegeman Karimi
(74) *Attorney, Agent, or Firm*—Merchant & Gould P.C.

(57) ABSTRACT

A method, apparatus, and system for tracking movement of a device are described. The method includes steps of implementing a first tracking subsystem for tracking positions of a device against a surface, determining whether to implement a second tracking subsystem for tracking positions of the device against the surface, capturing data corresponding to a location on the surface, and determining a position of the device against the surface based on the captured data. The position of the device can then be transmitted to a host computer and used in an application program. The first and second tracking subsystems may be a relative and an absolute tracking subsystem respectively.

28 Claims, 22 Drawing Sheets

METHODS AND APPARATUSES FOR COMPOUND TRACKING SYSTEMS

FIELD OF THE INVENTION

Aspects of the present invention are directed generally to tracking systems for detecting movement of devices, such as computer input devices. More particularly, aspects of the present invention are directed to a compound tracking device to track the movement of the device by absolute and relative tracking methods.

BACKGROUND OF THE INVENTION

User interaction with computers continues to increase each day. More jobs require individuals to interact with computers and more people are choosing to interact with computers for both work and entertainment. Various tracking devices for interacting with a computer include electronic mice, keyboards, joysticks, and touch pads. Other tracking devices, including personal digital assistants (PDAs), cellular telephones, and electronic pens, allow users to interact with different computers and computer systems.

Coupled with the increase in user interaction, there has been an increasing need for more precise interaction. For example, a user can process an image that she captured with her digital camera on a host computer that is running an application program for manipulation of images. She may want to change the color or contrast on certain portions of image to brighten up the green color of the grass or blue color of the sky. In doing so, the user may identify portions of the image to process by using one of the various tracking devices for interacting with the host computer. The user may have an electronic mouse with an actuatable button, allowing the user to press and hold the button to encircle the portion she wishes to process. In such a scenario, the user may wish to have very precise identification of the portions in which to process.

Tracking devices fall into one of two types of systems: a relative tracking system and an absolute tracking system. A relative tracking system has the ability to discern relative motion from one position to another, independent of knowledge of absolute position. Methods of relative optical tracking include image correlation, differential pattern gradient based, laser speckle based and Doppler-based among others. One feature of a relative tracking system is that one or more sensors detect signals that change over time and can be processed in various ways to determine changes in relative position. An absolute tracking system has the ability to discern a position of the device irrespective of a previous determination. Computer input devices such as electronic mice and trackballs implement relative tracking systems while electronic pens commonly implement absolute tracking systems. Tracking devices typically do not include both relative and absolute tracking systems. Cost, size, and difficulty in combing the two from a technological standpoint have left manufactures choosing from one of the two methods when constructing their respective devices. As such, when a user operates an input device for interacting with one computer, she may not be able to interact properly with another computer or more precisely with the one computer. A user must have two different devices for performing the different methods of tracking.

SUMMARY OF THE INVENTION

There is therefore a need for a computer input device tracking system that can track the movement of a device based upon a relative tracking system and an absolute tracking system and transmit the position of the tracked movement as an input to a computer application. One aspect of the invention provides a method for tracking movement of a device, the method including steps of implementing a first tracking subsystem for tracking positions of a device against a surface, determining whether to implement a second tracking subsystem for tracking positions of the device against the surface, capturing data corresponding to a location on the surface, and determining a position of the device against the surface based on the captured data. The position of the device can then be transmitted to a host computer and used in an application program.

Another aspect provides a system for tracking movement of a device, the system including a device and a host computer. The device includes a sensor, configured to track a position of the device, and a first tracking subsystem, configured to receive the captured data and output determined position data of the device. The host computer includes a second tracking subsystem, the second tracking subsystem configured to output representative position data, wherein the host computer is in communication with the device and is configured to receive the determined position data, to compute representative position data of the device, and to apply the representative position data as an input to an application program.

In accordance with at least one aspect of the present invention, a device configured to track a position based on both an absolute tracking subsystem and a relative tracking subsystem is described. A compound tracking device and/or system includes both tracking methods.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
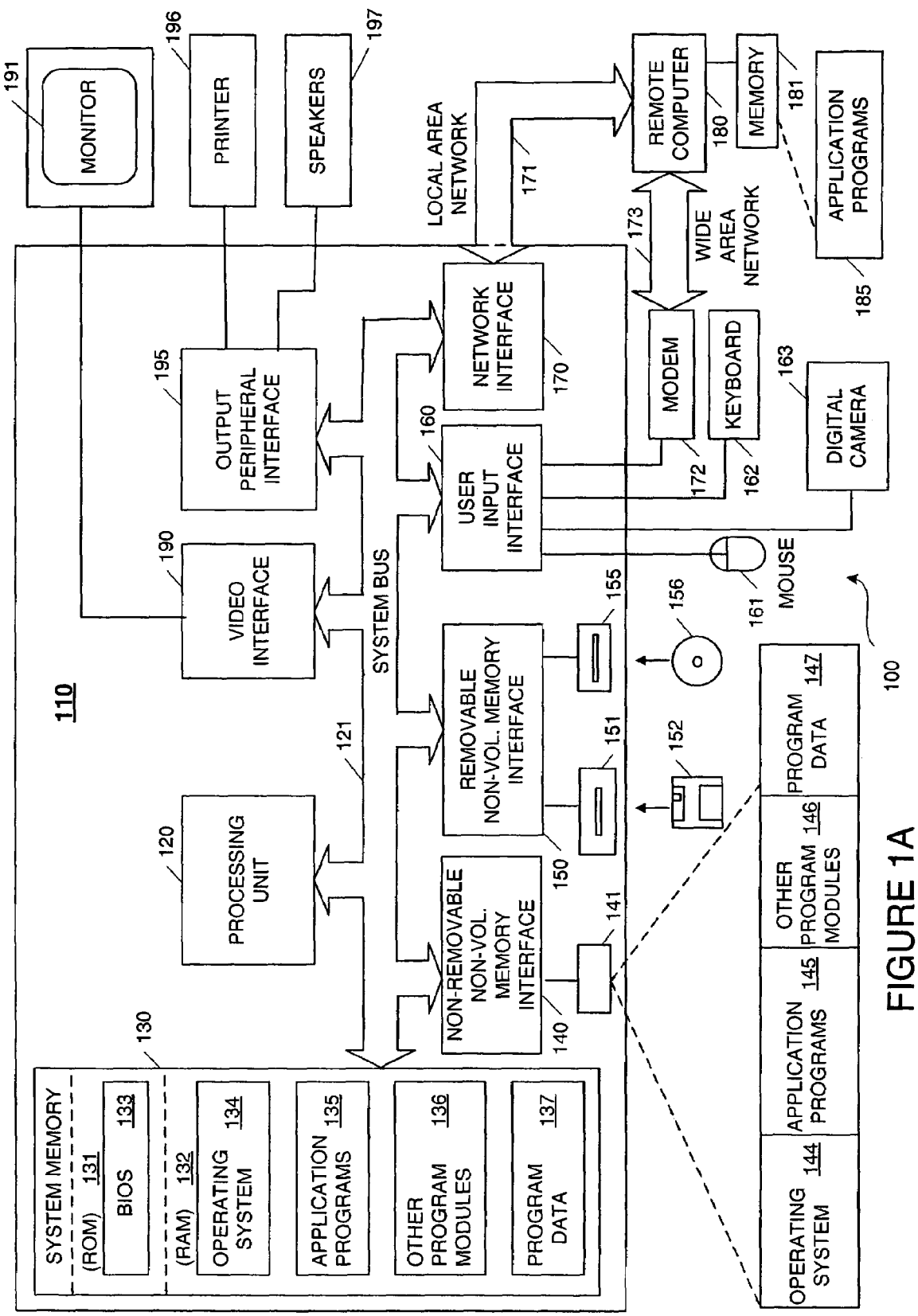
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
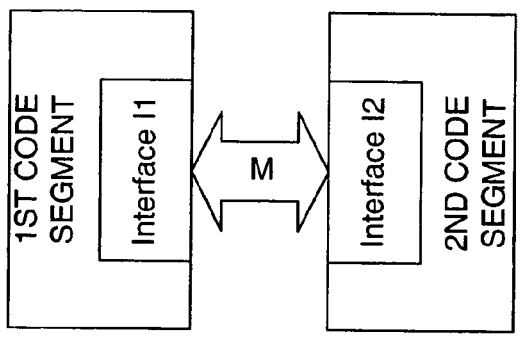
FIGS. 1B through 1M show a general-purpose computer environment supporting one or more aspects of the present invention.
Figure 1E:
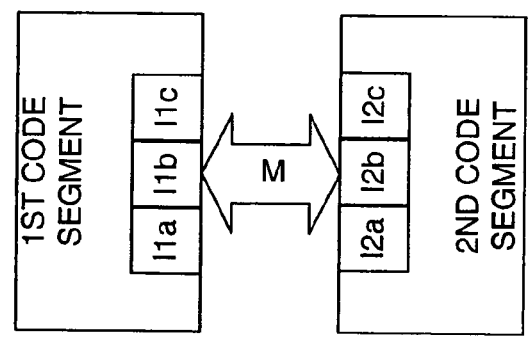
Figure 1B:
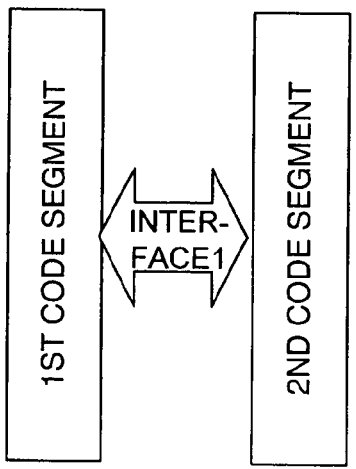

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
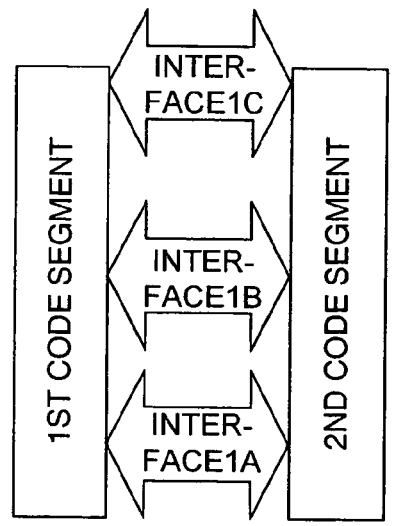

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface 2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
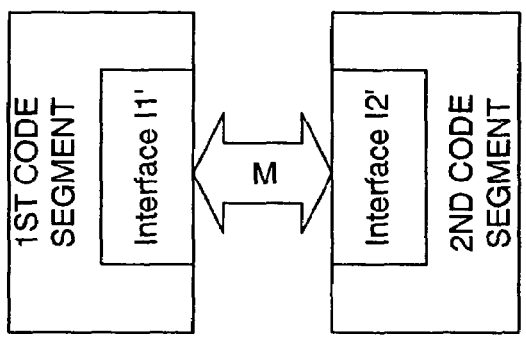
Figure 1G:
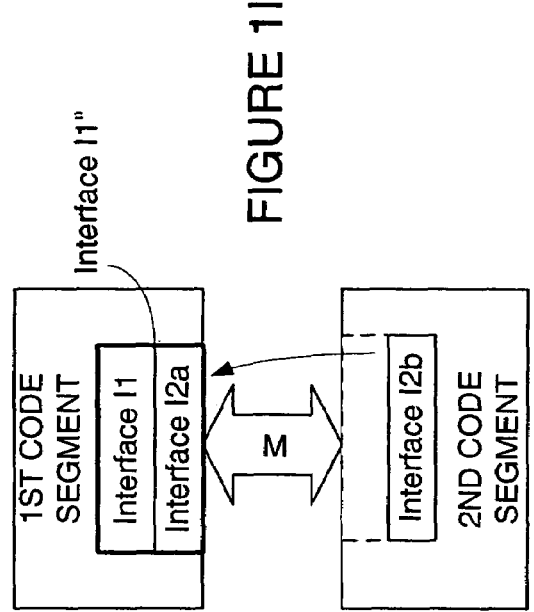

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
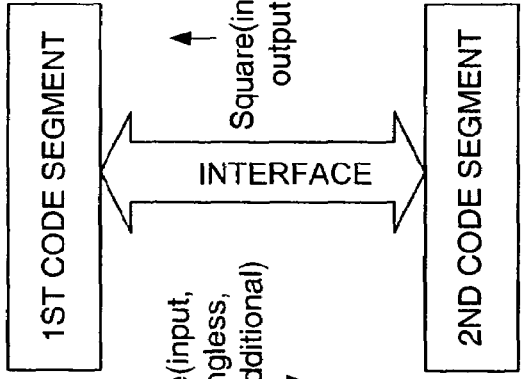
Figure 1I:
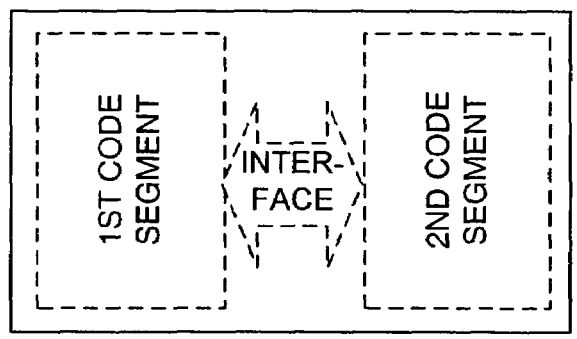

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
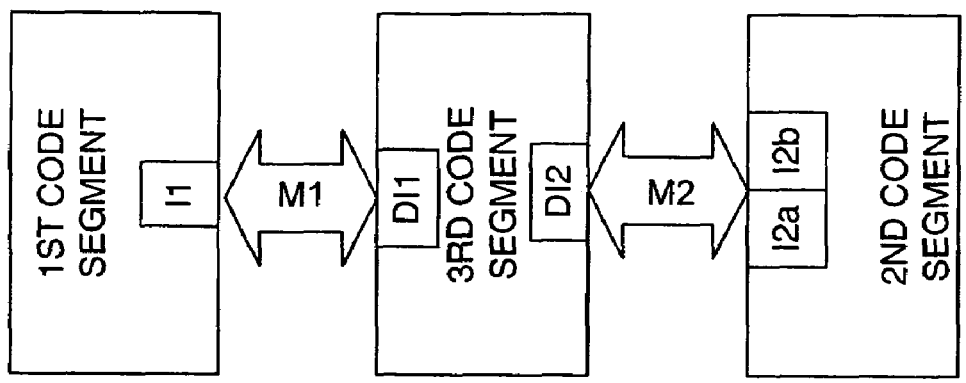
Figure 1J:
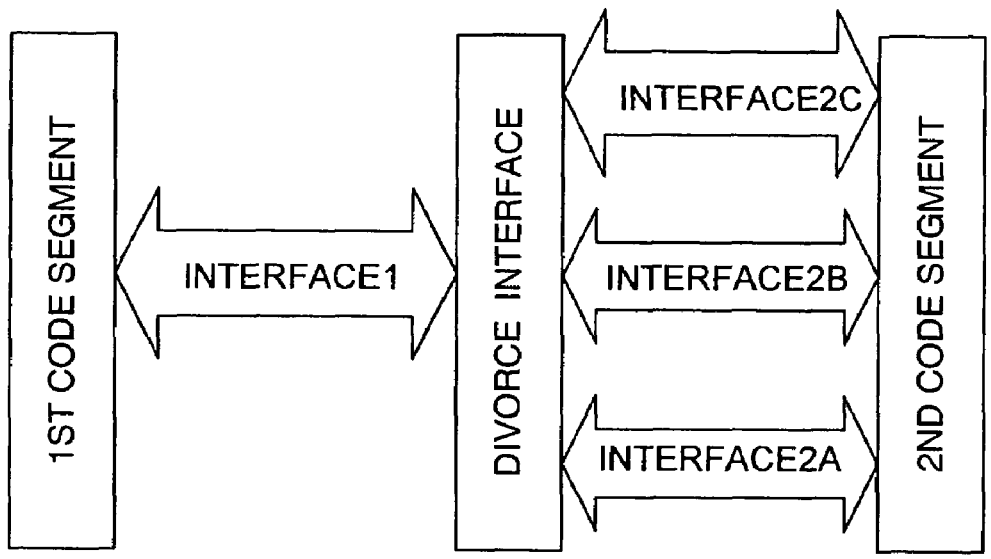

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
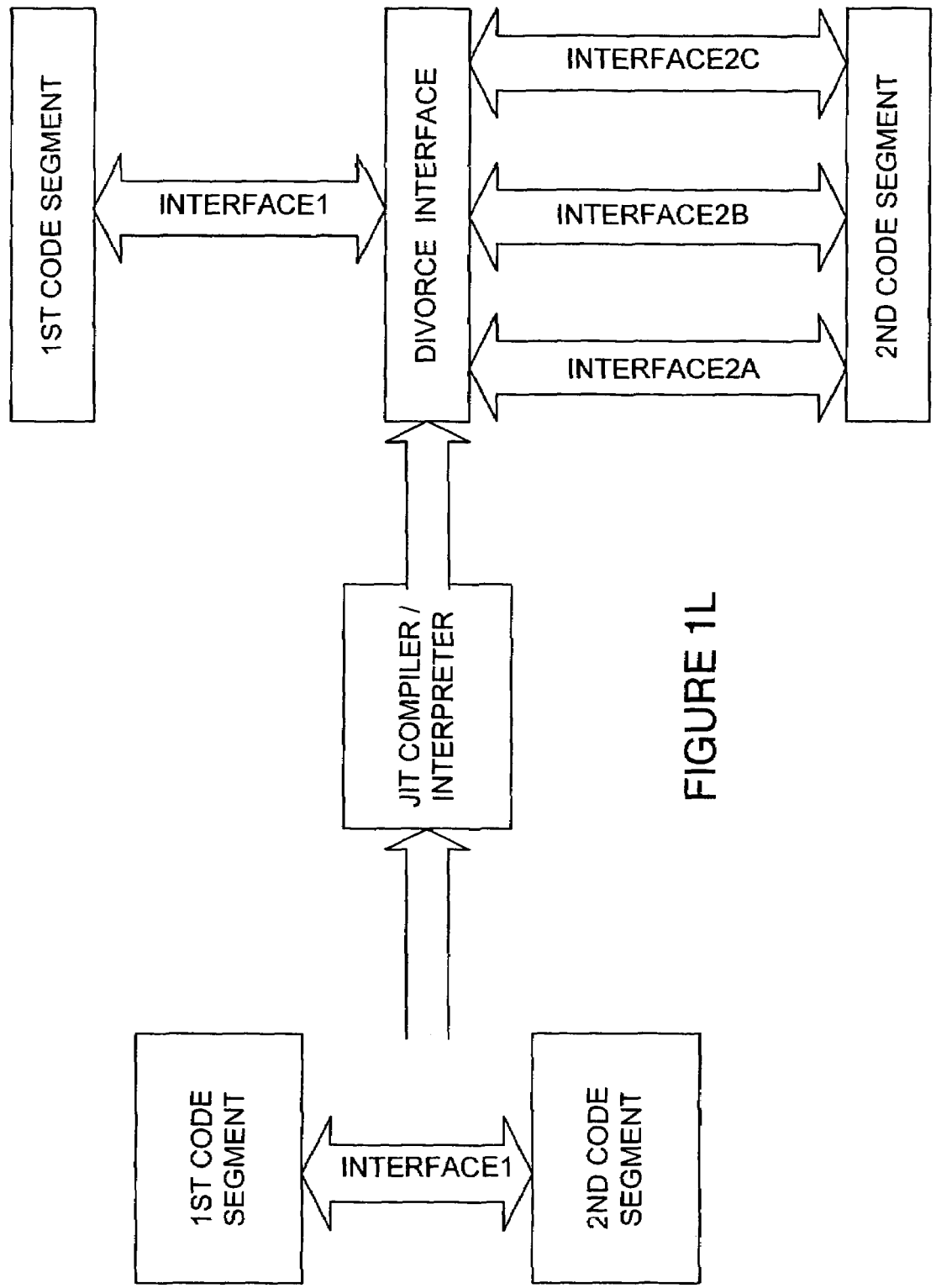
Figure 1M:
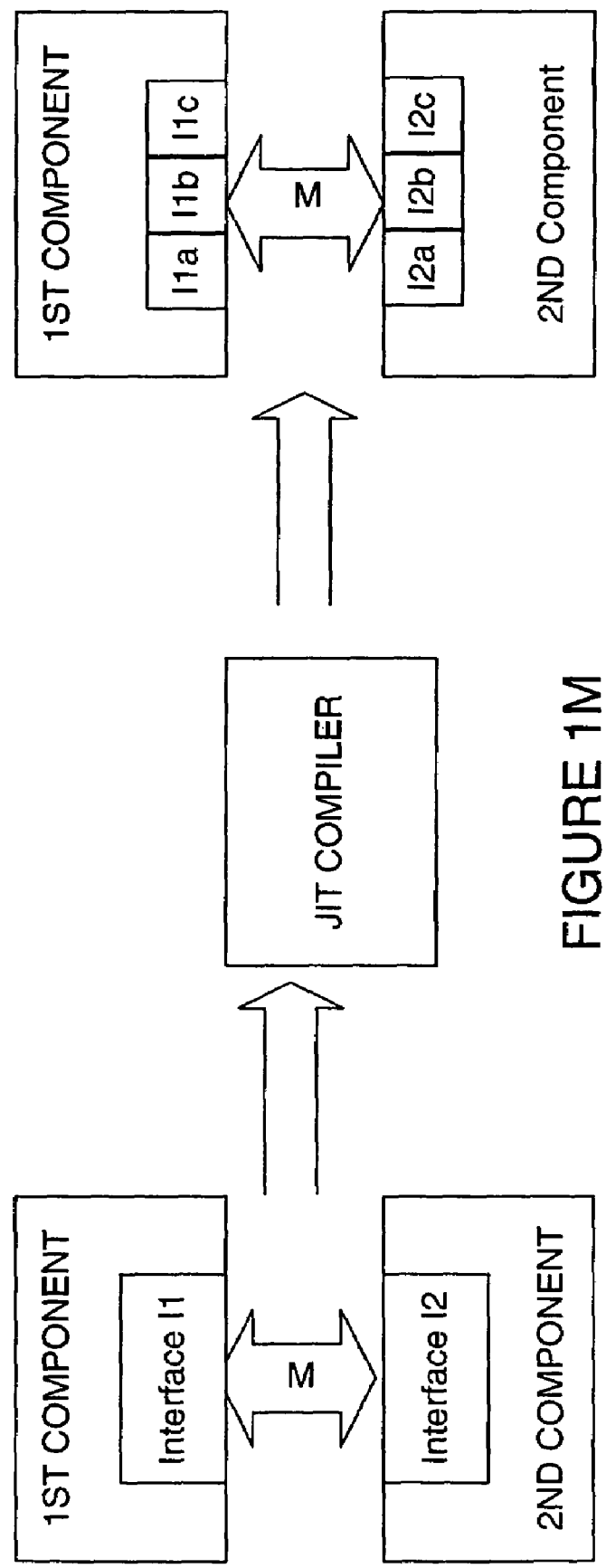

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
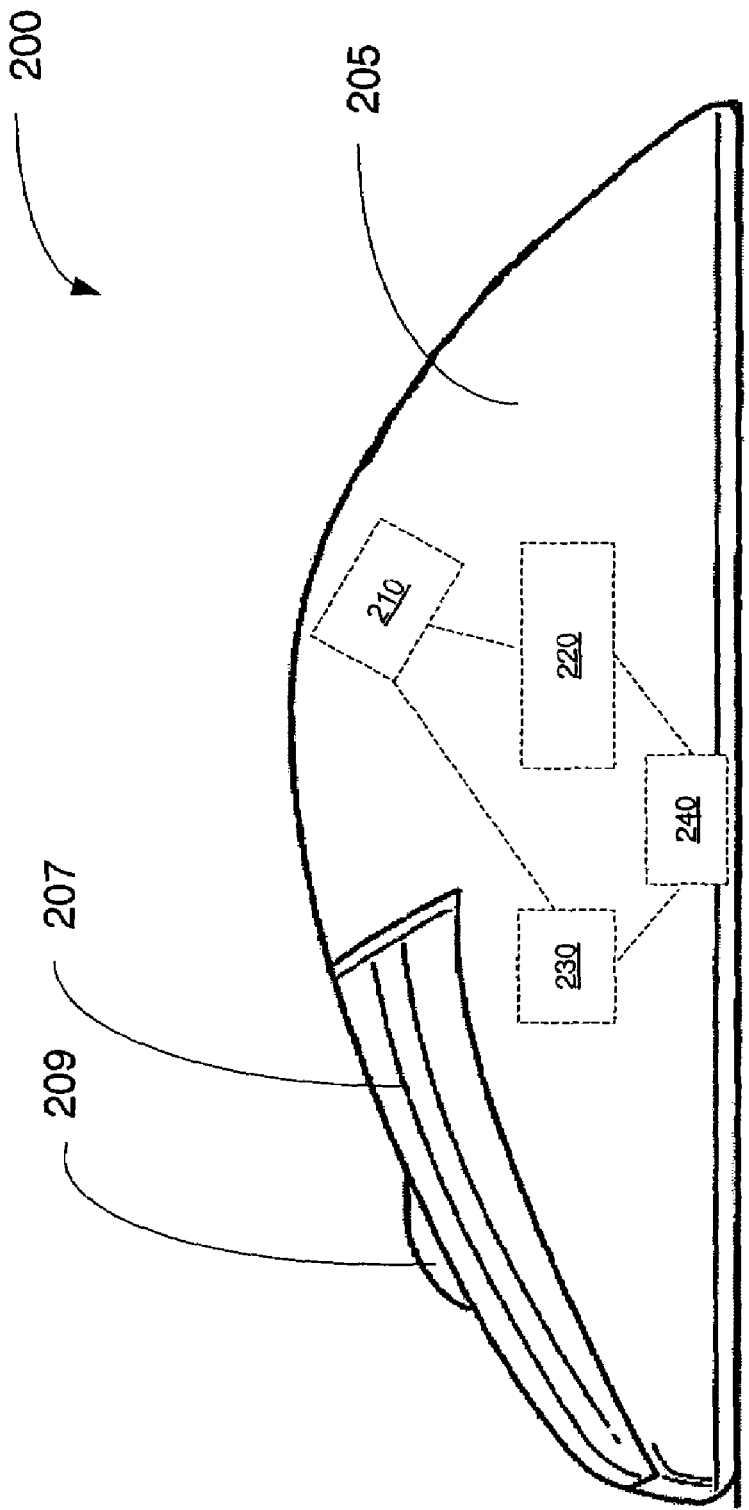
FIGS. 2A and 2B are schematic side views of computer input devices with a relative tracking system and absolute tracking system in accordance with at least one aspect of the present invention.

FIG. 2A is a side view of a computer input device 200 with a schematic representation of internal components. Computer input device 200 includes a housing 205. The bottom of the housing 205 is a substantially flat surface that is arranged to rest on a supporting surface such as a desk or tabletop, but could also simply be held by a user. The upper portion of the housing 205 is shaped to comfortably interface with and support a human hand. Computer input device 200 may be computer input device 161 shown in FIG. 1A as a mouse. Computer input device 200 may include actuatable buttons 207 allowing a user to press and click an entry and/or perform an action with the computer input device 200. Computer input device 200 may also include a scroll wheel 209. Computer input device 200 also is shown to include a control system 210, a relative tracking subsystem 220, an absolute tracking subsystem 230, and a sensor 240. Reference elements 210, 220, 230, and 240 are shown in broken line form to represent that these components may be internal to the computer input device 200. It should be understood by those skilled in the art that a number of different devices may be included within the term computer input device. Example computer input devices include electronic mice, electronic pens, personal digital assistants (PDA), digital cameras, cellular phones, trackball mice, touchpads, joysticks, and electronic devices attached to an individual, such as a glove that, when worn, can be used to track the movement of the individual's hand and/or finger for inputting information into a computer.

Control system 210 may be a silicon chip, a digital component, and/or a microprocessor component for computation of data, processing of signals, and interface with a host computer (not shown). Control system 210 is shown to be connected to each subsystem, relative tracking subsystem 220 and absolute tracking subsystem 230. Each tracking subsystem 220 and 230 is shown connected to sensor 240. As shown in FIG. 2A, each subsystem uses the sensor 240 for capturing data for tracking the movement of the computer input device 200. Although not shown in FIG. 2A, each tracking subsystem 220 and 230 may have an independent sensor 240 for tracking purposes. Further, it should be understood that sensor 240 may be included within each subsystem 220 and 230. It should be understood that if a common sensor 240 is used for both subsystems 220 and 230, the frame rates for each subsystems may be different and the quantity of data provided to each subsystem may be different. For example a larger set of data may be captured and needed for the absolute position decoding, while a subset of that data can be used for the relative tracking, allowing quicker processing.

Figure 8:
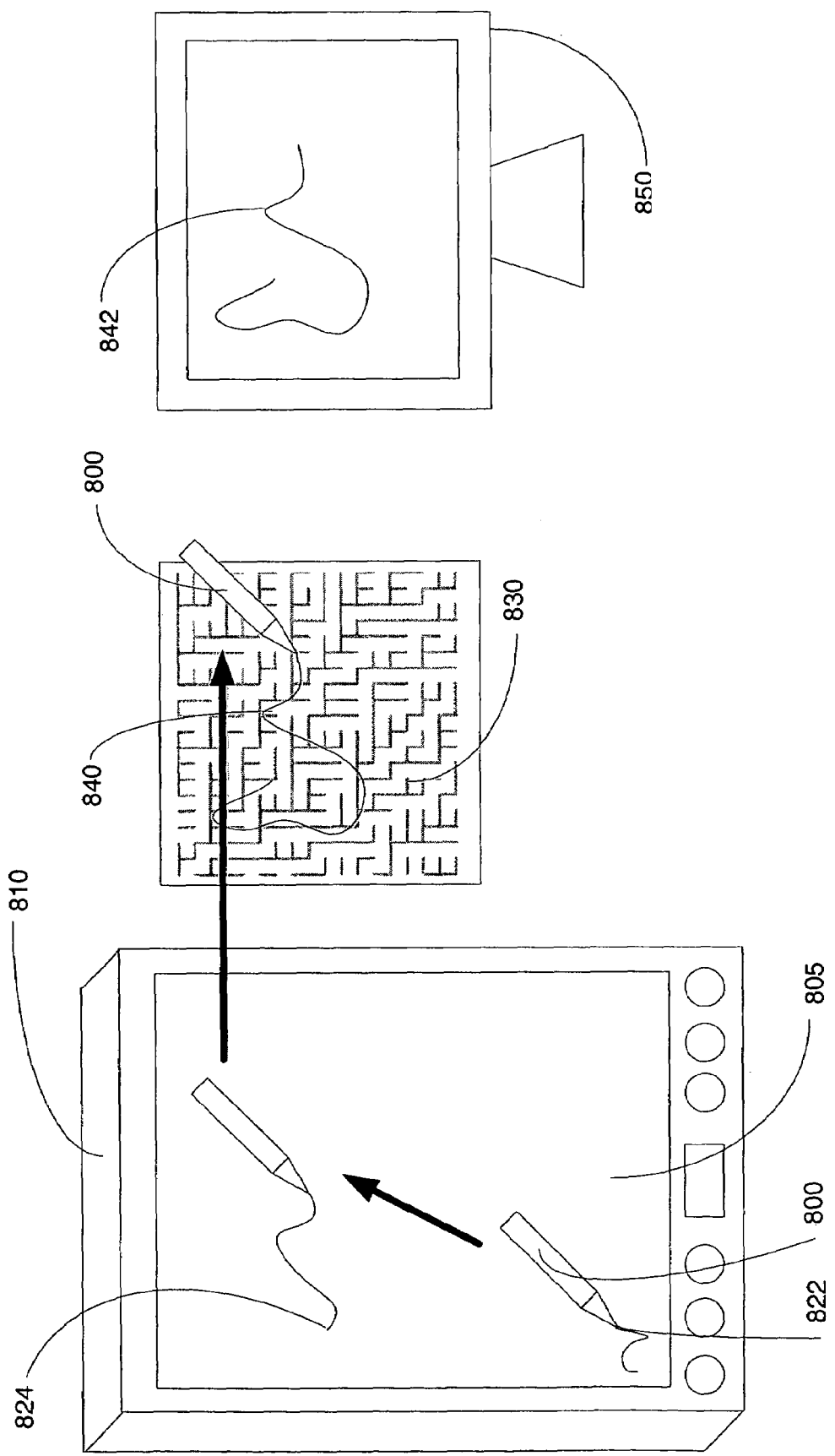
FIG. 8 is a schematic diagram of an illustrative embodiment of a computer device tracking system for use with a computer application in accordance with at least one aspect of the present invention.

Sensor 240 captures data corresponding to movement of the computer input device 200. The data is sent through the relative tracking subsystem 220 and/or the absolute tracking subsystem 230 where the data is processed to determine position data representative of the approximate position of the computer input device 200. The position data is then sent to the control system 210 where the data is subsequently sent to a host computer (not shown) for use in an application program. For example, the movement of the computer input device 200 may correspond to the movement of a cursor position on a display of the host computer as shown in FIG. 8 and described below. Although not shown in FIG. 2A control system 210 may include a memory for storing the position data for transmission to the host computer at a later time.

Computer input device 200 represents an illustrative example of a compound tracking device that is configured to track the movement of the computer input device 200 by a relative tracking method and/or an absolute tracking method. The capability to track based upon a relative tracking method and an absolute tracking method is contained within the same physical housing 205 of computer input device 200. It should be understood by those skilled in the art that control system 210, relative tracking subsystem 220 and absolute tracking subsystem 230 may be implemented by hardware components, software components, firmware components, and/or any combination of hardware, software, and firmware components.

Figure 2B:
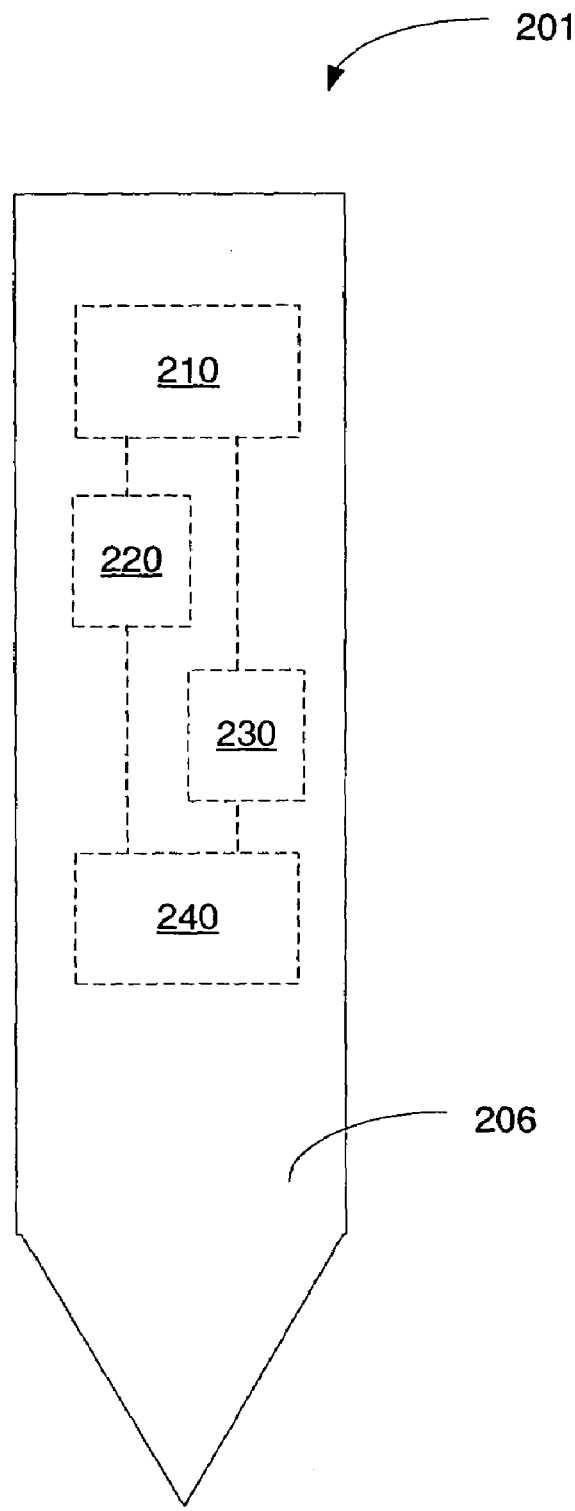

FIG. 2B is a side view of a computer input device 201 with a schematic representation of internal components. Computer input device 201 includes a housing 206. Computer input device 201 may be an electronic pen-type device. Computer input device 201 may include actuatable buttons and/or sensors, such as zero travel binary contact sensors or Force Sensitive Resistors (FSR), allowing a user to press and click an entry and/or perform an action with the computer input device 201. Computer input device 201 also is shown to include a control system 210, a relative tracking subsystem 220, an absolute tracking subsystem 230, and a sensor 240. Reference elements 210, 220, 230, and 240 are shown in broken line form to represent that these components may be internal to the computer input device 201.

Control system 210 may be a custom silicon chip, a digital component, and/or a microprocessor component for computation of data, processing of signals, and interface with a host computer (not shown). Control system 210 is shown to be connected to each subsystem, relative tracking subsystem 220 and absolute tracking subsystem 230. Each tracking subsystem 220 and 230 is shown connected to sensor 240. As shown in FIG. 2B, each subsystem uses the sensor 240 for capturing data for tracking the movement of the computer input device 201. Although not shown in FIG. 2B, each tracking subsystem 220 and 230 may have an independent sensor 240 for tracking purposes. Further, it should be understood that sensor 240 may be included within each subsystem 220 and 230. It should be understood that if a common sensor 240 is used for both subsystems 220 and 230, the frame rates for each subsystems may be different and the quantity of data provided to each subsystem may be different. For example a larger set of data may be captured and needed for the absolute position decoding, while a subset of that data can be used for the relative tracking, allowing quicker processing.

Sensor 240 captures data corresponding to movement of the computer input device 201. The data is sent through the relative tracking subsystem 220 and/or the absolute tracking subsystem 230 where the data is processed to determine position data representative of the approximate position of the computer input device 201. The position data is then sent to the control system 210 where the data is subsequently sent to a host computer (not shown) for use in an application program. For example, the movement of the computer input device 201 may correspond to the movement of a cursor position on a display of the host computer as shown in FIG. 8 and described below. Although not shown in FIG. 2B, control system 210 may include a memory for storing the position data for transmission to the host computer at a later time.

Computer input device 201 represents an illustrative example of a compound tracking device that is configured to track the movement of the computer input device 201 by a relative tracking method and/or an absolute tracking method. The capability to track based upon a relative tracking method and an absolute tracking method is contained within the same physical housing 206 of computer input device 201. It should be understood by those skilled in the art that control system 210, relative tracking subsystem 220 and absolute tracking subsystem 230 may be implemented by hardware components, software components, firmware components, and/or any combination of hardware, software, and firmware components.

Figure 3A:
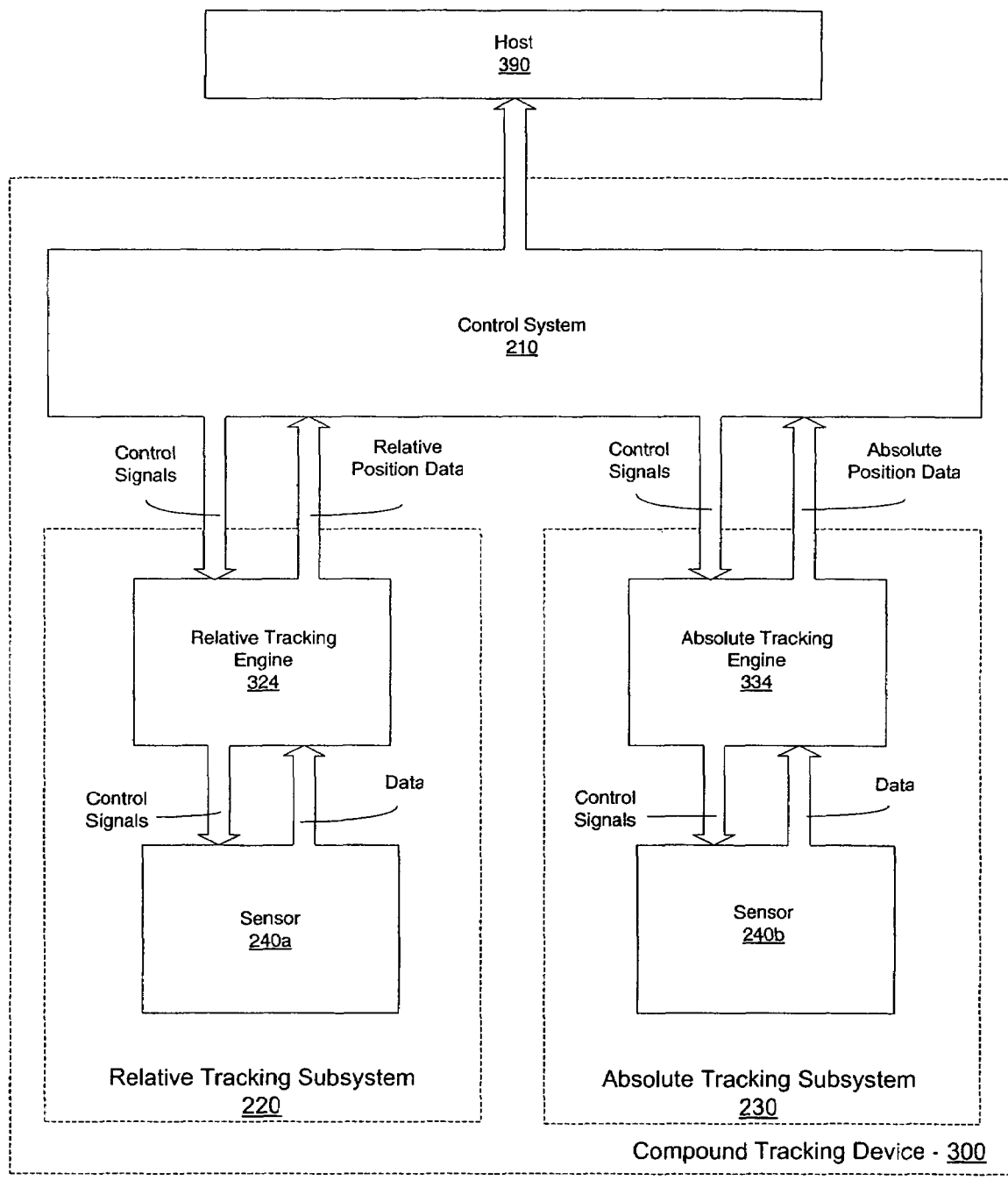
FIG. 3A is a functional block diagram of an illustrative embodiment of a compound tracking device for tracking a position of the compound tracking device in accordance with at least one aspect of the present invention.

FIG. 3A shows a compound tracking device 300 which is composed of two tracking subsystems 220 and 230. Each of the subsystems contains a sensor 240a and 240b which collects data and a processor 324 and 334 which controls that sensor 240a and 240b and collects and processes the data from the sensors 240a and 240b. Sensors 240a and 240b may be the same sensor 240 that is shared by both tracking subsystems 220 and 230. Sensors 240a and 240b may be an optical and/or magnetic sensor or some other type of sensor. Compound tracking device 300 is shown to communicate with a host computer 390. Compound tracking device 300 communicates with host computer 390 through a control system 210. Control system 210 may include a memory (not shown) that can store the captured data for later processing and/or transmission to the hose computer 390. Control system 210 may communicate with host computer 390 by means of a variety of methods, including a hardwired connection by a serial or USB port, by a wireless communication path, such as by Bluetooth technology, and/or any other type of communication method.

Control system 210 is shown to transmit to and receive signals and data from each subsystem 220 and 230 via a tracking engine 324 and 334 respectively. Relative tracking engine 324 is part of the relative tracking subsystem 220. Relative tracking engine 324 receives control signals from the control system 210 and transmits appropriate signals to the sensor 240a in response. Relative tracking engine 324 also receives data from sensor 240a. Data may include optical information and/or measurement data that is used to track the position of the compound tracking device 300. Upon receiving the data from sensor 240a, relative tracking engine 324 may process the data to determine relative position data that is sent to the host computer 390 through the control system 210. Alternatively, relative tracking engine 324 may pass the data received from sensor 240a to the control system 210 which may perform the computations to determine the position of the device 300 in accordance with a relative tracking method and/or may pass the data through the control system 210 to the host computer 390 which may perform the necessary computations to determine the position of the compound tracking device 300 based upon a relative tracking method. In accordance with various embodiments, computations may be performed by the relative tracking engine 324, the control system 210 and/or the host computer 390.

Similar to relative tracking subsystem 220, absolute tracking subsystem 230 may include a sensor 240b and an absolute tracking engine 334. Absolute tracking engine 334 receives control signals from the control system 210 and transmits appropriate signals to the sensor 240b in response. Absolute tracking engine 334 also receives data from sensor 240b. Upon receiving the data from sensor 240b, absolute tracking engine 334 may process the data to determine absolute position data that is sent to the host computer 390 through the control system 210. Alternatively, absolute tracking engine 334 may pass the data received from sensor 240b to the control system 210 which may perform the computations to determine the position in accordance with an absolute tracking method and/or may pass the data through the control system 210 to the host computer 390 which may perform the necessary computations to determine the position of the compound tracking device 300 based upon an absolute tracking method. In accordance with various embodiments, computations may be performed by the absolute tracking engine 334, the control system 210 and/or the host computer 390.

Control system 210 assimilates data and communicates it in some way. As described herein, components of the tracking subsystems 220 and 230 may be combined and/or shared in some way. For example, the sensor 240a and 240b in each of the subsystems may be a common sensor 240. The absolute subsystem 230 provides absolute position data to control system 210, while the relative tracking subsystem 220 provides relative movement data. The relative movement data and the absolute position data can be used separately or together depending on the need of a user, the efficiency of the two tracking subsystems, and/or to determine a more precise position of the device 300.

In another embodiment of the present invention, sensor 240a may be used to capture data for use by the relative tracking engine 324. The relative tracking subsystem 220 may be the default tracking subsystem used by the compound tracking device 300. The relative tracking subsystem 220 may operate for a predetermined time and/or distance before the absolute tracking subsystem 230 is initiated. For example, the relative tracking subsystem 220 may capture data and, after 2 seconds, sensor 240b captures an image. The absolute tracking engine 334 may immediately process the data to determine absolute position data for eventual transmission to the host computer 390 through the control system 210. The absolute position data and/or the relative position data may be stored in a memory (not shown) within the compound tracking device 300; In another embodiment, the absolute tracking subsystem 230 may be the default tracking subsystem.

Figure 3B:
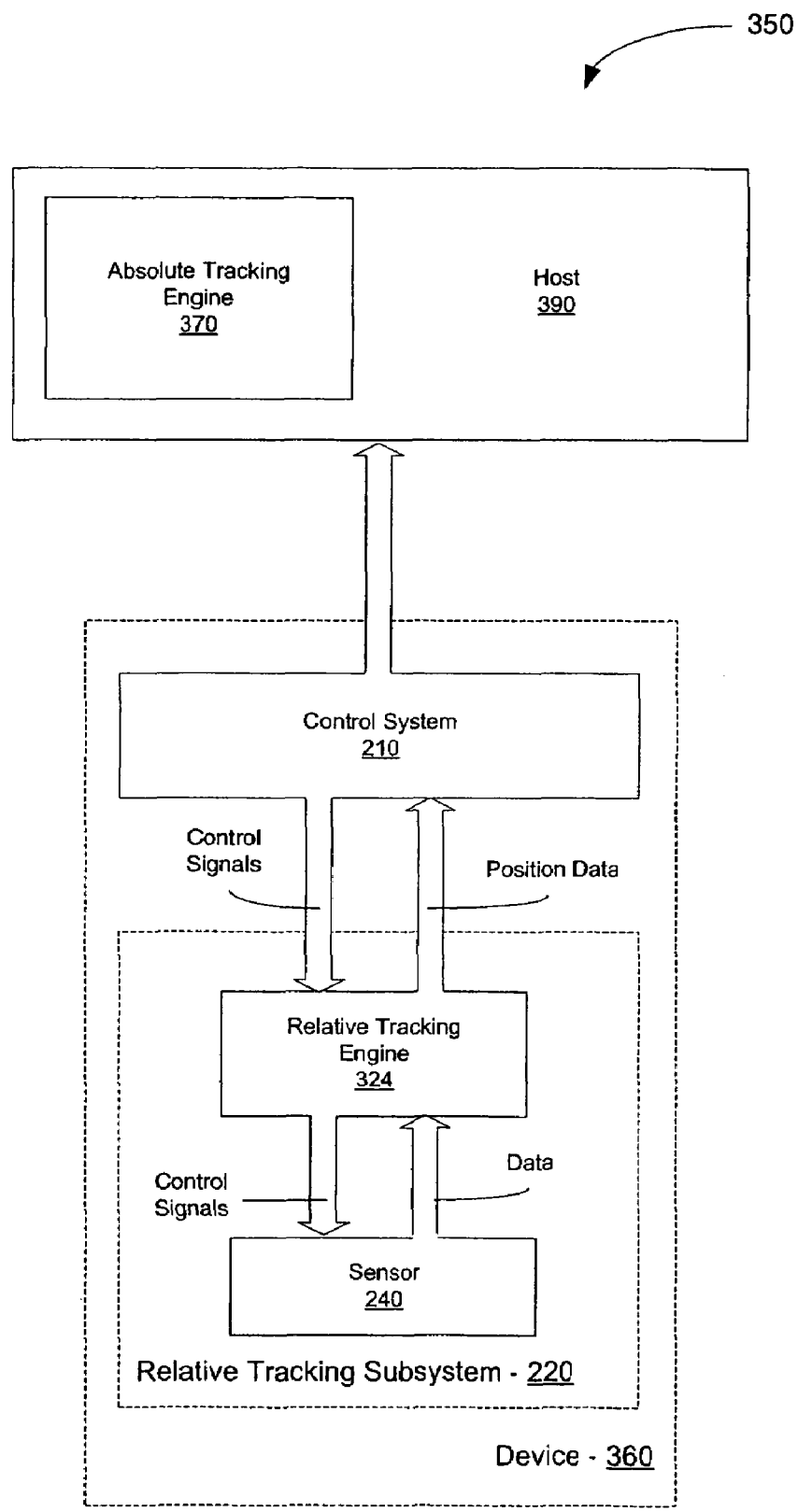
FIG. 3B is a functional block diagram of an illustrative embodiment of a compound tracking system for tracking a position of a device in accordance with at least one aspect of the present invention.

FIG. 3B is a functional block diagram of an illustrative embodiment of a compound tracking system 350 for tracking a position of a device 360 in accordance with at least one aspect of the present invention. Compound tracking system 350 includes a device 360. Device 360 may be a computer input device that tracks its position based upon a relative tracking method. Device 360 includes a relative tracking subsystem 220. Relative tracking subsystem 220 includes a sensor 240 and a relative tracking engine 324. As described above in FIG. 3A, sensor 240 captures data and sends the data to the relative tracking engine 324. Relative tracking engine 324 processes the data and sends the processed position data to control system 210 which sends the position data to the host computer 390. Similarly, control system 210 controls operation of the sensor 240 and relative tracking engine 324 by means of control signals.

As shown in FIG. 3B, host 390 includes an absolute tracking engine 370. Absolute tracking engine 370 can compute the position of the device 360 based upon an absolute tracking method. The data received from sensor 240 can be used by the absolute tracking engine 370 to determine the movement of the device 360 in accordance with an absolute tracking method. As shown, the device 360 and the host computer 390 comprise the compound tracking system 350. Although not shown in the Figures, it should be understood by those skilled in the art that computations of data for determination of position data based upon an absolute and/or a relative tracking method may be performed entirely by a device, such as a computer mouse, electronic pen, or personal digital assistant, entirely by a host computer, or a combination of the two.

In another embodiment of the present invention, sensor 240 may be used to capture data for use by the relative tracking engine 324. The relative tracking subsystem 220 may be the default tracking subsystem used by the device 360. The relative tracking subsystem 220 may operate for a predetermined time and/or distance before a snapshot of an image is captured for absolute tracking processing purposes. For example, the relative tracking subsystem 220 may capture data and, after 2 seconds, sensor 240 captures an image. The captured data may be stored in a memory (not shown) within the device 360. At some time, the data may be sent, through the control system 210, to the host computer 390. At the host computer, the absolute position data can be determined based upon the received captured data and the absolute tracking engine 370.

In another embodiment, the absolute tracking subsystem 230 may be the default tracking subsystem.

Figure 3C:
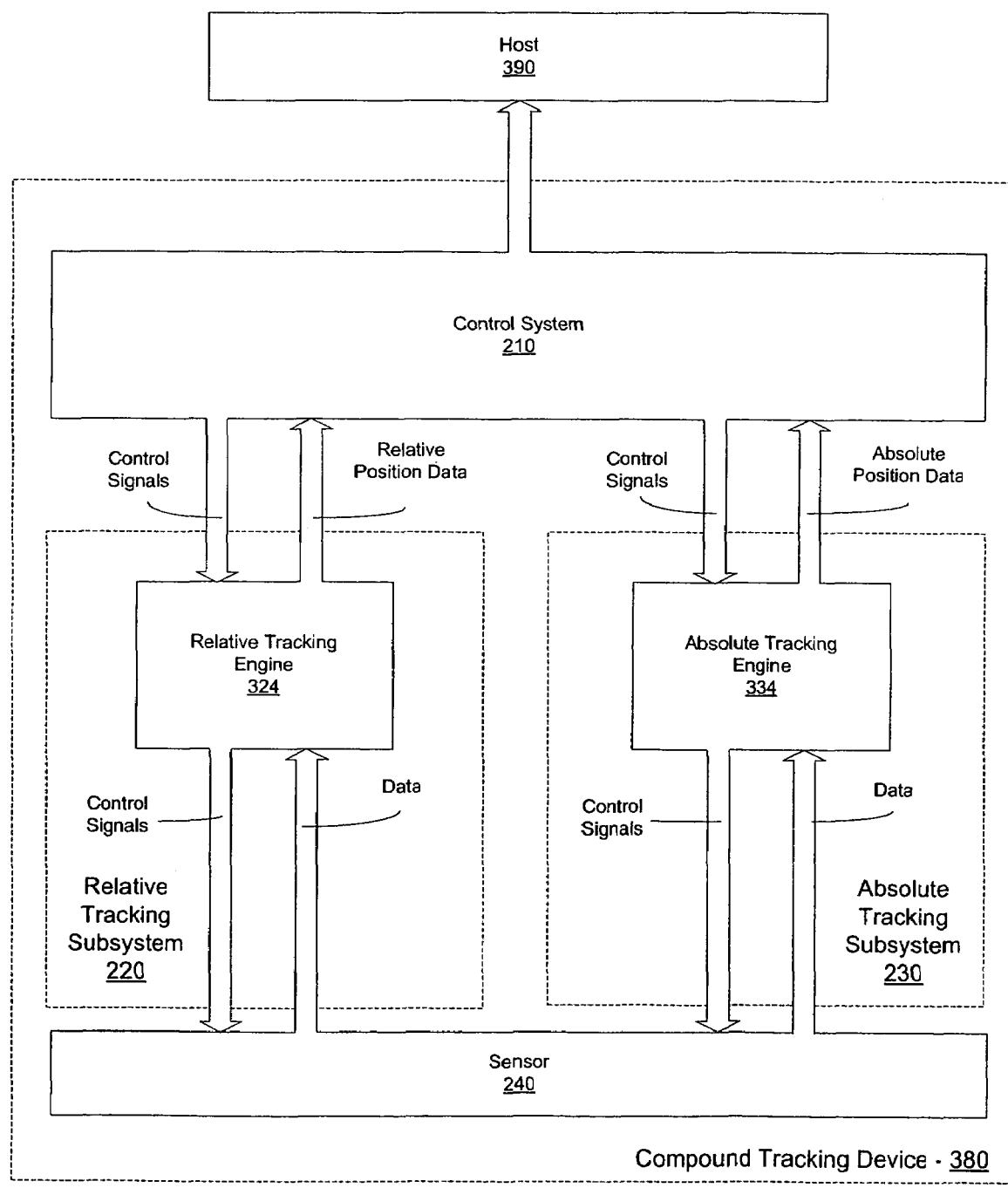
FIG. 3C is a functional block diagram of an illustrative embodiment of a compound tracking device for tracking a position of the compound tracking device in accordance with at least one aspect of the present invention.

FIG. 3C shows a compound tracking device 380 which is composed of two tracking subsystems 220 and 230. Compound tracking device 380 also contains a sensor 240 which collects data. Each subsystem 220 and 230 includes a processor 324 and 334 which controls the sensor 240 and collects and processes the data from the sensor 240. Sensor 240 may be an optical and/or magnetic sensor or some other type of sensor. Compound tracking device 380 is shown to communicate with a host computer 390. Compound tracking device 380 communicates with host computer 390 through a control system 210. Control system 210 can communicate with host computer 390 by means of a variety of methods, including a hardwired communication path, a wireless communication path, and/or any other type of communication path.

Control system 210 is shown to transmit to and receive signals and data from each subsystem 220 and 230 via tracking engine 324 and 334 respectively. Relative tracking engine 324 is part of the relative tracking subsystem 220. Relative tracking engine 324 receives control signals from the control system 210 and transmits appropriate signals to sensor 240 in response. Relative tracking engine 324 also receives data from sensor 240. Data may include optical information and/or measurement data that is used to track the position of the compound tracking device 380. Upon receiving the data from sensor 240, relative tracking engine 324 may process the data to determine relative position data that is sent to the host computer 390 through the control system 210. Alternatively, relative tracking engine 324 may pass the data received from sensor 240 to the control system 210 which may perform the computations to determine the position of the device 380 in accordance with a relative tracking method and/or may pass the data through the control system 210 to the host computer 390 which may perform the necessary computations to determine the position of the compound tracking device 380 based upon a relative tracking method. In accordance with various embodiments, computations may be performed by the relative tracking engine 324, the control system 210 and/or the host computer 390.

Similar to relative tracking subsystem 220, absolute tracking subsystem 230 may include an absolute tracking engine 334. Absolute tracking engine 334 receives control signals from the control system 210 and transmits appropriate signals to sensor 240 in response. Absolute tracking engine 334 also receives data from sensor 240. Upon receiving the data from sensor 240, absolute tracking engine 334 may process the data to determine absolute position data that is sent to the host computer 390 through the control system 210. Alternatively, absolute tracking engine 334 may pass the data received from sensor 240 to the control system 210 which may perform the computations to determine the position in accordance with an absolute tracking method and/or may pass the data through the control system 210 to the host computer 390 which may perform the necessary computations to determine the position of the compound tracking device 380 based upon an absolute tracking method. In accordance with various embodiments, computations may be performed by the absolute tracking engine 334, the control system 210 and/or the host computer 390.

Control system 210 assimilates data and communicates it in some way. The absolute subsystem 230 provides absolute position data to control system 210, while the relative tracking subsystem 220 provides relative movement data. The relative movement data and the absolute position data can be used separately or together depending on the need of a user, the efficiency of the two tracking subsystems, and/or to determine a more precise position of the device 380.

Figure 4B:
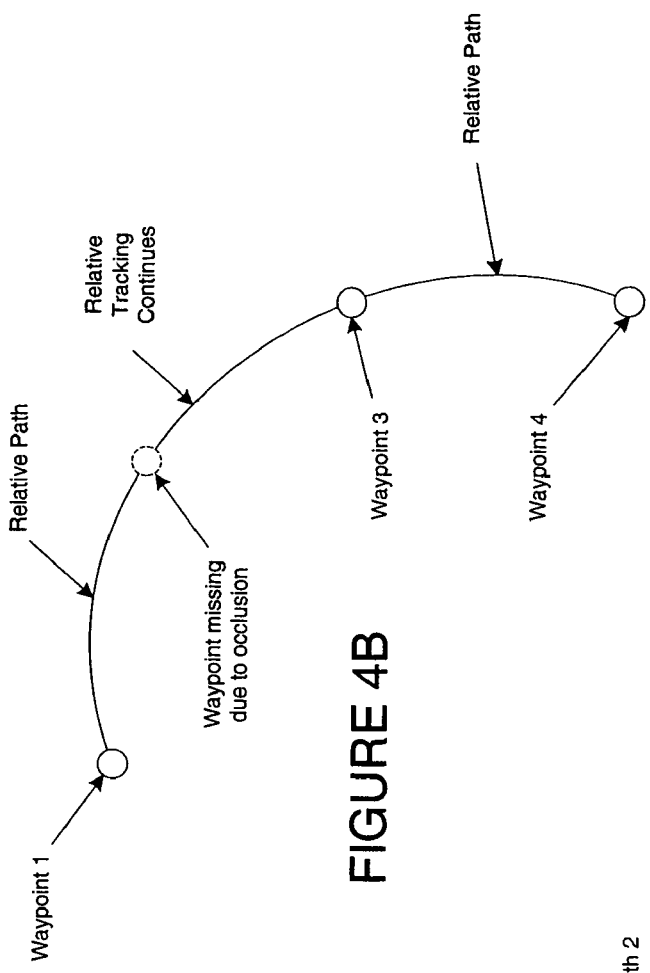
FIGS. 4A and 4B are schematic diagrams of an illustrative embodiment of tracking positions of a contact point in accordance with at least one aspect of the present invention.
Figure 4A:
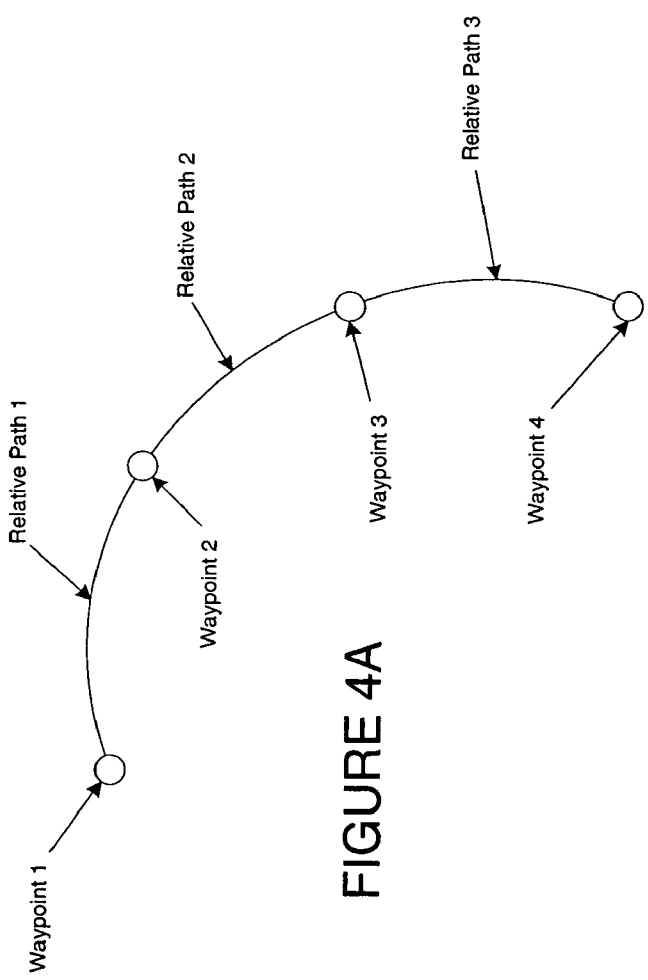
Figure 9:
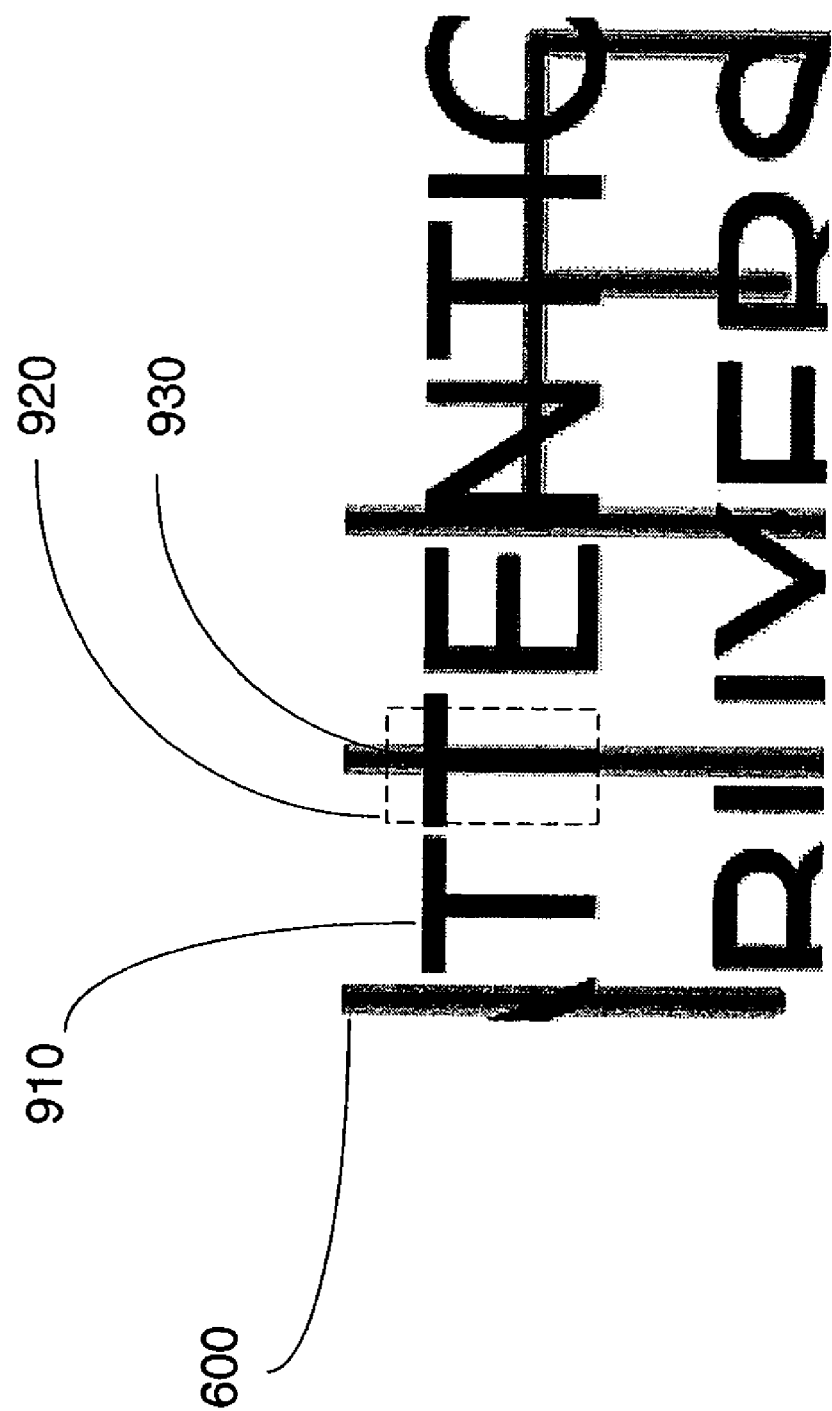
FIG. 9 is a schematic diagram of an illustrative embodiment of an occluded encoded surface in accordance with at least one aspect of the present invention.

FIGS. 4A and 4B are schematic diagrams of an illustrative embodiment of tracking positions of a contact point in accordance with at least one aspect of the present invention. FIG. 4A is an illustrative example of a system that uses the absolute tracking subsystem in conjunction with the relative tracking subsystem to ensure a precise determination of the movement of a device. FIG. 4A shows positions which are calculated by the absolute tracking subsystem relatively infrequently (on a machine time-scale) to determine an absolute position (waypoint) of a device. The relative tracking subsystem is then used to determine the intermediate positions, shown as relative paths. If, during the allotted time slot, the absolute tracking subsystem is unable to determine a location of the device, such as due to an occlusion, the position of the device may continue to be updated based on the relative tracking subsystem. FIG. 4B illustrates just such a situation. As shown, waypoint 2 is missing, e.g., cannot accurately be determined based upon the absolute tracking subsystem since the underlying encoded pattern has been occluded. For example, as shown in FIG. 9 and discussed later, textual data may be obstructing the underlying encoded pattern, thereby restricting the system from being able to accurately determine the absolute position of the device. Because waypoint 2 is missing in FIG. 4B, the relative tracking method continues to track the position of the device to waypoint 3.

Figure 5:
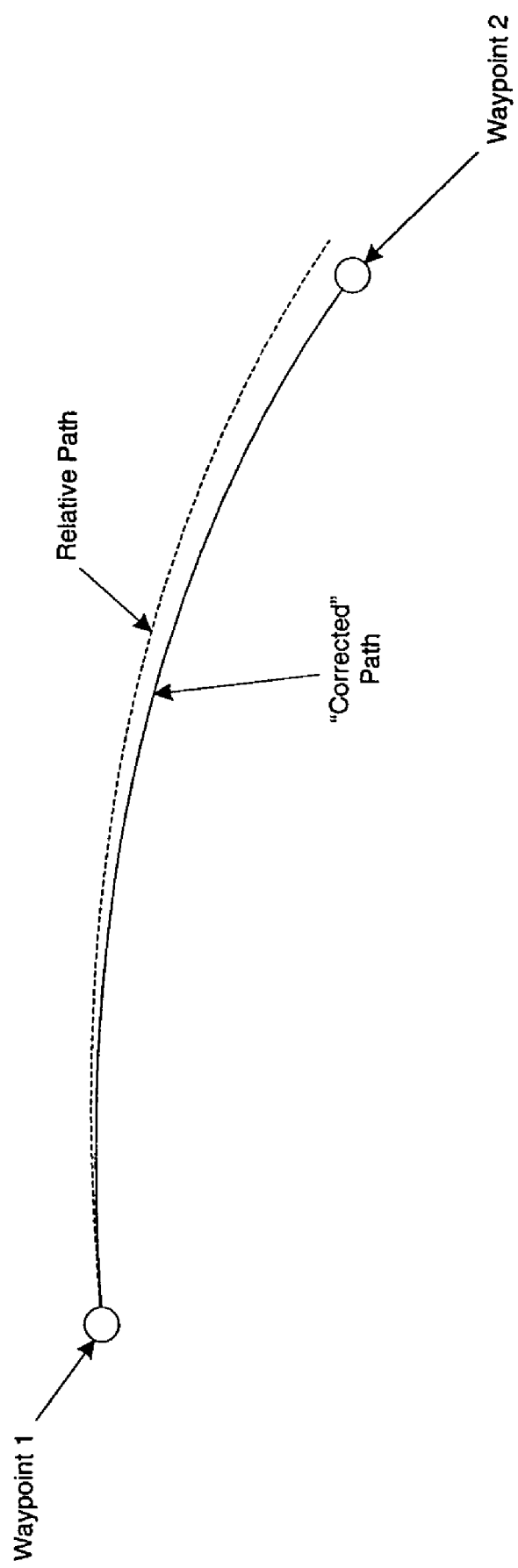
FIG. 5 is another schematic diagram of an illustrative embodiment of tracking positions of a contact point in accordance with at least one aspect of the present invention.

Navigation by dead reckoning is defined as estimating a position by calculating distance, direction, and amount of time that has been traveled from a known location. The waypoints are the absolute positions determined by the absolute subsystem, and the dead reckoning navigation determines the path between those waypoints. Positions calculated by dead reckoning are susceptible to error due to the compounding of errors in the calculation of distance, direction, and time. However, in accordance with at least one aspect of the present invention, the absolute tracking subsystem may provide the absolute position reference thus enabling the control system to correct the error in any previously determined intermediate positions. The actual path traveled by the device is then recreated as shown in FIG. 5. Thus, the relative tracking subsystem provides the tracking data to the control system and the absolute tracking subsystem provides periodic waypoint data to sync with the relative tracking data thereby allowing error correction.

Each of the subsystems will have different costs in terms of processing power, size, price, and power consumption. Depending on the architecture and/or intent of a given compound tracking device or system, the balance of these costs will be different. Therefore, it may be useful to alter the balance between the two subsystems accordingly. A user may want a certain type of tracking to occur for most and/or all purposes. Alternatively, a default tracking system may be used, and/or a determination based upon some type of efficiency, whether economic, power conservation, and/or computational time, may be made to implement a particular tracking system.

To aid in the detection and/or positioning of a device, the surface of an object over which the device is positioned may include image data that indicates the position of areas of the surface. In one exemplary embodiment, the surface being imaged or scanned may comprise the display of a host computer or other external computing device, which may correspond to the monitor of a desktop computer, a laptop computer, Tablet PC™, a personal data assistant, a telephone, digital camera, or any device which may display information. Accordingly, a blank document or other image generated on the screen of a Tablet PC™ may include data corresponding to a code that represents the position of that portion of the document within the entire document, or any other portion of the image. The information may be comprised of images, which may include alphanumeric characters, a coding pattern, or any discernable pattern of image data that may be used to indicate a position. The image or images selected for use in designating the location of areas upon the surface of the object may depend on the sensitivities of the scanning device, such as the pixel resolution of a sensor, and/or the pixel resolution of the image data contained within the surface being scanned. The location information extracted from the surface may then be used to track movement of the device over the surface based upon an absolute tracking method. Using the location information, electronic ink or other information corresponding to movement of the device may be accurately generated. Location information may be used to both detect the position upon the surface at which the input is to be affected, as well as to provide an indication of movement of the device over the surface. The resulting location information may be used interactively with word processing software to generate changes in a document, for example.

In an alternate embodiment, the object used in combination with the device may be composed of paper with positional information included in the background, for example. The positional information may be incorporated in any form of code, optical representation, or other form that may be sensed by a sensor associated with the device and used to represent the absolute location of the specific site on the paper.

Figure 6:
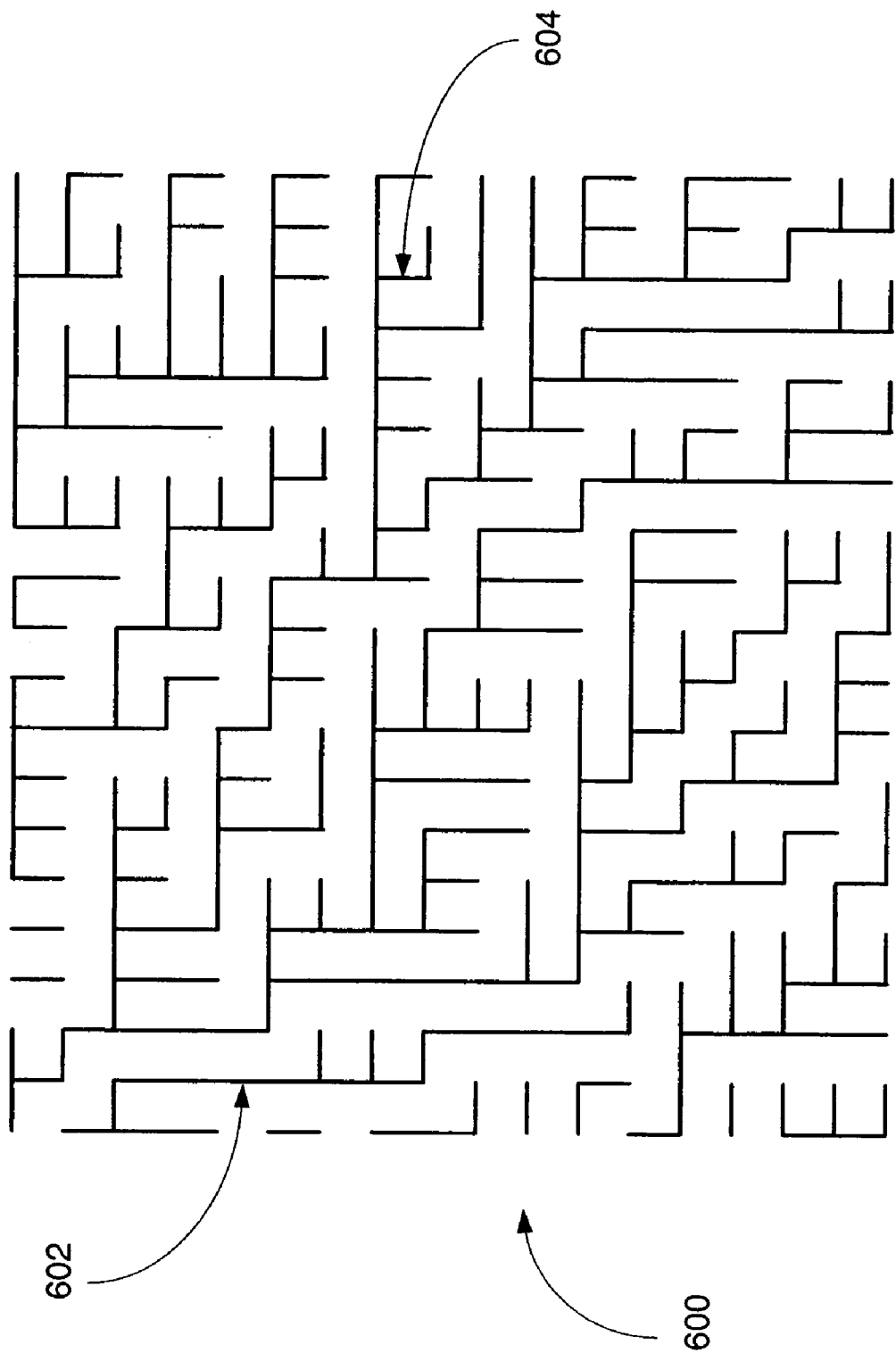
FIG. 6 illustrates an example technique (maze pattern) for encoding the location of a document.

FIG. 6 illustrates an example of a technique for encoding the location of a document. In this example, the background of the image may include thin lines that, when viewed in large groups, form a maze-like pattern 600. Each grouping of lines within the maze design 600 is comprised of a few thin lines with unique orientations and positions, for example, may indicate the position 602 of that portion of the maze pattern compared to another portion 604 of the document. Decoding of the maze pattern 600 found in a captured image may be performed in accordance with numerous decoding schemes. The maze pattern 600 may be slightly visible. The maze pattern 600 is configured to not interfere with writing, drawing, and/or reading. For example, a user can place the maze pattern 600 on a piece of white printer paper. The user can connect the paper to a surface, such as a wall in an office and/or conference room, and make annotations on the paper, allowing the device to track its absolute movement over the paper. The maze pattern 600 may be printed unto a transparent film with a laser printer or any other printing process. Alternatively, the maze pattern 600 may be printed on a piece of paper. It should be understood by one skilled in the art that the medium for placement of maze pattern 600 is not limited to the examples of a transparent film and/or paper as described above and that any type of medium for writing and/or drawing may be included, such as, but not limited to construction paper, a wall, a wooden surface, a blackboard surface, a computer screen, and a floor. It should be understood by those skilled in the art that the ink used to place an encoded pattern onto a surface may be visible or invisible to a user. If invisible to a user, an infrared or ultraviolet light source may be necessary to allow the underlying pattern to be seen.

In one embodiment, a particular arrangement and grouping of lines may be decoded to generate positional information. In another embodiment, an indication of the position of the captured data may be derived by extracting a code from the image corresponding to the sampled pattern, and using that code to address a look-up table containing data identifying the location of that area. One type of pattern 600 is known as a watermark pattern. A watermark pattern may be a low visibility, two dimensional (2D) bit pattern superimposed on the usual images displayed on a computer screen. The bit patterns are encoded so that a small subset are of them, located anywhere on the screen, can be decoded to yield the-position of the subset area. This enables an imaging device, such as a hand-held stylus, pen, or other device, to determine its absolute position on the pattern. In the watermark pattern, the decodable positions are spaced regularly across the surface with a given pitch or spacing. This spacing defines the precision with which the location of each position, thus the position of the device, can be decoded. These positions are absolute in that they do not change over time or depend on relative relationships to other positions. In another embodiment, the watermark could be changed, such as on a PC, notebook computer, or TabletPC screen. In such an embodiment, the watermark and document content could be displayed using screen pixels rather than being printed on paper, enabling the application to display a modified watermark based on interaction by the user. Although the illustrative examples in the Figures show an encoded pattern 600 of various two dimensional configurations, it should be understood by those skilled in the art that the encoded pattern 600 may be a dot-type pattern that includes decodable positions in a one dimensional configuration. The examples illustrates in the Figures are not limited to a particular type of encoded pattern 600.

Also, a watermark pattern may be embedded on a surface such as a paper document or computer monitor such that the pattern is uniquely decodable at each "position" on that surface. While one use of the watermark pattern is the ability of a device to track the location of the device within that surface, the watermark may also encode additional data. Positional data and/or additional data may be encoded in the pattern. The additional data may be decoded in a similar manner as methods to decode positional data. This additional data may be encoded at a low level, but spanning a larger space on the surface compared to encoded position data. A single or multiple application may be used to recover positional data only, additional data only, or both positional data and additional data. Some example of additional information include an image, a file identification, an audio file and/or clip, a video file and/or clip, a security feature, a cryptographic feature, biometric information, and/or links to other information.

The design of a watermark pattern, such as pattern 600, may take into account numerous considerations. One of these considerations is the density of the watermark pattern on the surface. The watermark pattern needs to be sufficiently light so as to be acceptably unobtrusive to users of the device while also encoding a sufficient quantity and quality of information for proper functionality of the device. Additionally, the encoded information may be designed to meet minimum requirements of redundancy and integrity to allow an acceptable level of error detection/correction. In trying to minimize the level of distraction to the user of the pattern 600, it may be desirable to encode as little information as possible, while in trying to maximize the functionality of the device, it may desirable to maximize the quantity and redundancy of information. Any particular need may be achieved by a balance of the density of positional information possible, thereby increasing the positional precision, to minimize the user distraction due to the pattern.

A watermark based absolute tracking system lacks the ability to track positions in situations where the watermark pattern is missing or occluded. Many surfaces upon which a tracking device might be useful contain non-watermark patterns, printing, or data. An example of such is shown in FIG. 9 and described below. These obstructions can include text or images, textures on a surface, and shadows. These obstructions can occlude the watermark pattern embedded on the surface, which can reduce the ability of the device to capture and process the watermark pattern to decode the unique fixed position or other data. In such a situation, the device would lose track of its current position which may cause functionality to be reduced.

Relative tracking systems are useful for tracking movement on a large number of surfaces. Even in the absence of position data, images captured by the sensor 240 may be analyzed to determine the location of the device at the time of image capture. Successive images may be used to calculate the change in relative position of the device at different times. Correlation of these images may yield an accurate trace of the device over the surface. Using this trace information, electronic ink accurately representing handwritten strokes may be generated, for example.

In one embodiment of the present invention, an electronic pen-type computer input device, such as electronic pen 201, captures data for use by a relative tracking subsystem. The relative tracking subsystem captures data for relative tracking processing for a predetermined time and/or distance before an absolute tracking subsystem is initiated. A predetermined distance and/or time may trigger the initiation of the absolute tracking subsystem. The absolute tracking subsystem may immediately process the captured data to determine absolute position data for eventual transmission to a host computer. Alternatively, the absolute position data and/or the relative position data is stored in a memory within the electronic pen for subsequent transmission to the host computer. In another embodiment, the electronic pen-type computer input device captures absolute data that is subsequently processed at the host computer for tracking purposes as an input to an application.

Figure 7:
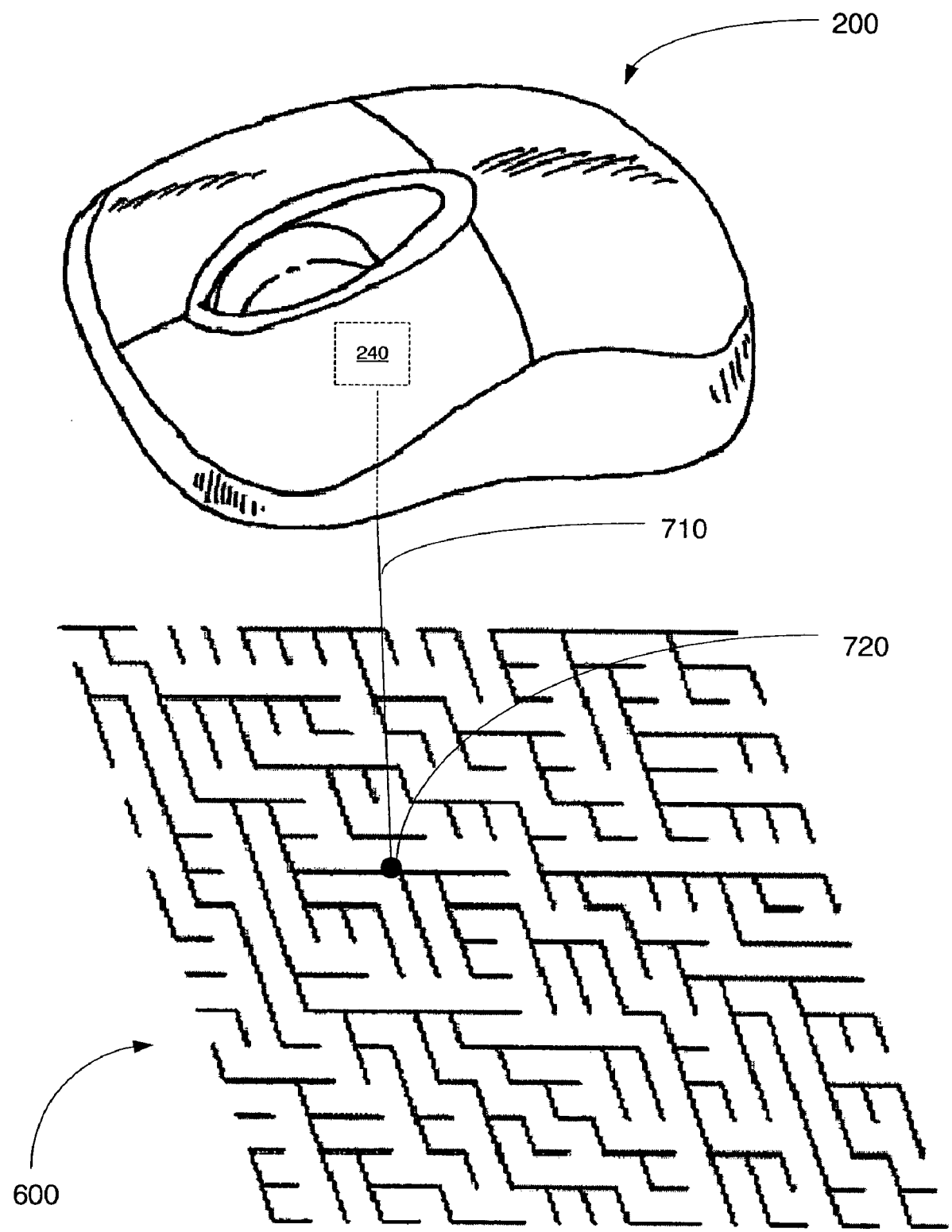
FIG. 7 is a schematic diagram of an illustrative embodiment of a computer input device tracking a contact point on an encoded surface in accordance with at least one aspect of the present invention.

FIG. 7 is a schematic diagram of an illustrative embodiment of a computer input device 200 tracking a position of contact 720 on an encoded surface 600 in accordance with at least one aspect of the present invention. Computer input device 200 is shown above encoded surface 600 for illustrative purposes only. Computer input device 200 may rest on encoded surface 600, such as in the case in which encoded surface 600 is embedded within a mouse pad. As shown, sensor 240 may be an optical sensor that captures data corresponding to a light 710 transmitted from the computer input device 200 and reflected back to the computer input device 200 from the surface 600. Light 710 includes image data regarding the position of contact 720 on the encoded surface 600. An optical system is but one method for detecting a position of contact 720 and it should be understood by those skilled in the art that other types of navigation systems may be employed, such as radar and magnetic based systems.

FIG. 8 is a schematic diagram of an illustrative embodiment of a computer device tracking system for use with a computer application in accordance with at least one aspect of the present invention. FIG. 8 illustrates how a computer input device 800 can be used to track movement of the computer input device 800 based upon a relative tracking method and an absolute tracking method. FIG. 8 shows a computer input device 800 as an electronic pen 800. A user can use electronic pen 800 on a screen 805 of a notebook type computer 810. Screen 805 is a predefined area in which the position of the electronic pen 800 can be tracked. As a user moves the electronic pen 800 across the surface of the screen 805, the position of the electronic pen may be tracked based on a relative tracking system. Points of contact 822 and 824 may be determined relative to other positions, to a trajectory of contact points, and/or some other relative feature.

In accordance with at least one aspect of the present invention, the user can use the same electronic pen 800 on a piece of encoded paper 830, such as a sheet of paper that includes an embedded pattern 600 shown in FIG. 6. As the user moves the electronic pen 800 across the surface of the paper 830, the movement 840 of the point of contact of the electronic pen 800 against the surface of the paper 830 can be tracked. The movement 840 is tracked based upon an absolute tracking method utilizing the encoded surface information. For example, a user can draw an object on the paper 830 and the object is entered into an application program running on a host computer. A monitor 850 connected to the host computer displays the corresponding object 842. The electronic pen 800 communicates with the host computer to send absolute position data for the application running on the host computer to use. It should be understood by those skilled in the art that the application program may be external to the host computer as well. Therefore, under at least one embodiment, the compound tracking device 800 may be used for absolute tracking purposes and/or relative tracking purposes without a host computer.

FIG. 9 is a schematic diagram of an illustrative embodiment of an occluded encoded surface 600 in accordance with at least one aspect of the present invention. FIG. 9 illustrates one embodiment of the compound tracking system of the present invention. As shown, text 910 is written over certain portions 920 of the encoded surface 600. For example, a user may have written a letter on the encoded surface 600 in a black ink that now obstructs 930 the underlying pattern in certain areas. Under such a condition, an absolute tracking system alone would not be able to accurately track movement of a device over the obstructed portion 920. In accordance with at least one embodiment of the present invention, the system can utilize the relative tracking subsystem to determine the position of the device over obstructed portions 920. As such, a more accurate representation of the position and movement of a device is achieved.

Figure 10:
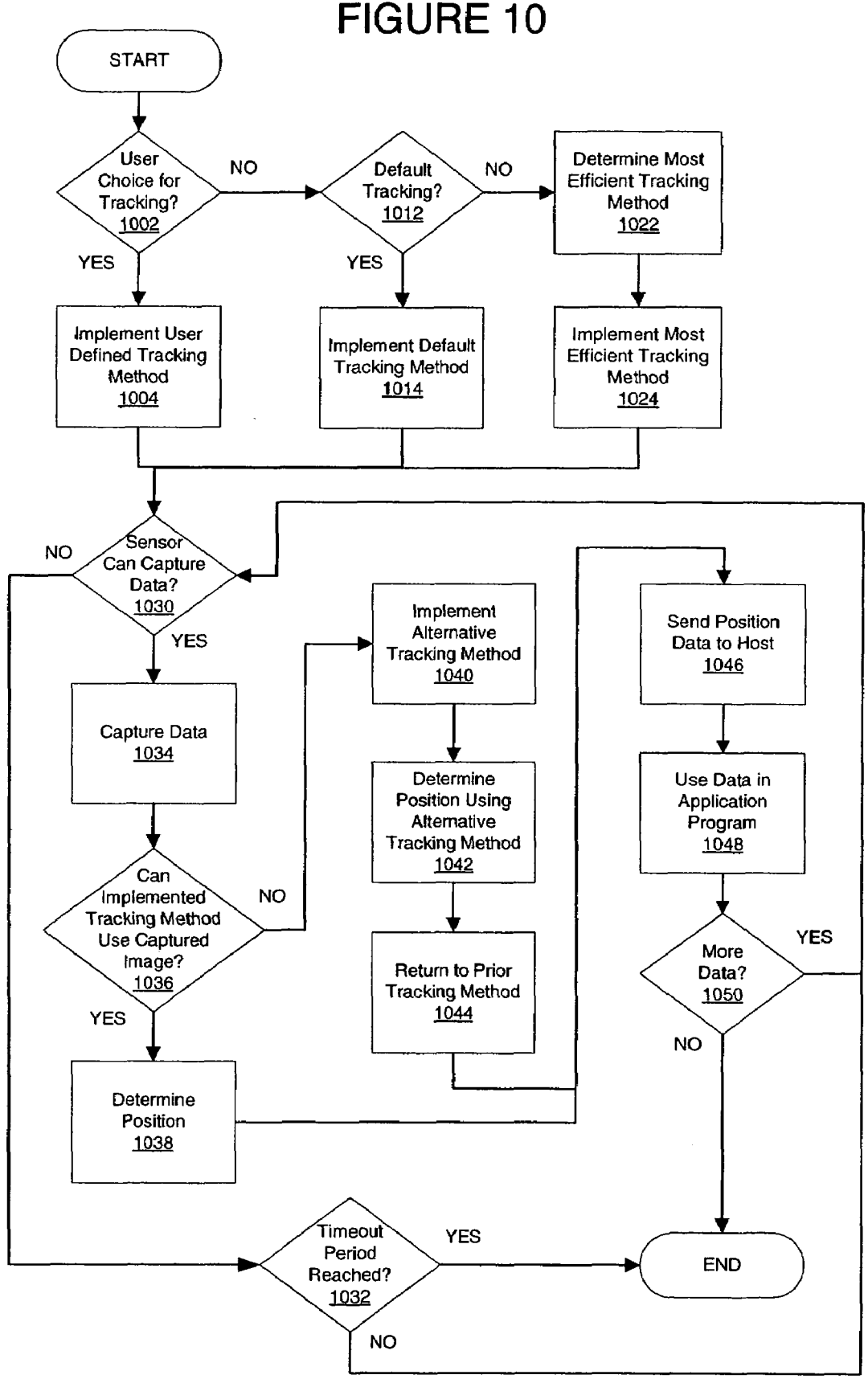
FIG. 10 is a flow chart of an illustrative method for tracking movement a device in accordance with at least one aspect of the present invention.

FIG. 10 is a flow chart of an illustrative method for tracking movement a compound tracking device in accordance with at least one aspect of the present invention. The process starts and at step 1002 a determination is made as to whether a user has specified a particular tracking method choice. For example, the user may decide that she wants the compound tracking device to track by a relative tracking method. If a user defined choice exists, the process moves to step 1004 where the user defined tracking method is implemented by the compound tracking device. If no user defined choice exists, the process moves to step 1012. At step 1012, a determination is made as to whether a default tracking method is to be implemented. For example, the compound tracking device may be preprogrammed by a user and/or a manufacturer to implement a particular default tracking method. If a default tracking method is to be implemented, the process moves to step 1014 where the default tracking method is implemented. If no default exists, the process moves to step 1022.

At step 1022, a determination of the most efficient tracking method is made. This determination of the most efficient tracking method may be based on any number of parameters. For example, the absolute tracking method may be more accurate, but may require more power for processing and/or take longer to process data, while the relative tracking method may be cheaper to implement and user less power but offer less accurate results. The determination of the most efficient method may be made by the system based upon a preexisting setting and/or by a user entry of what the efficiency settings are, e.g., time for processing, power conservation, accuracy, etc. At step 1024, the most efficient method determined in step 1022 is implemented.

For any of the paths taken, the process moves to step 1030 where a determination is made as to whether the sensor can capture the data. For example, step 1030 may include determining whether the sensor can capture the underlying encoded pattern using an absolute tracking method. Step 1030 may also include determining whether the sensor has integrated long enough to capture the image data. If the sensor cannot capture the data, the process proceeds to step 1032 where another determination is made as to whether a timeout period has been reached. For example, the device may have a predetermined time period in which to attempt to capture data before performing another operation. If the timeout period has been reached, the process ends. If the timeout period has not been reached, the process returns to step 1030. If the sensor can capture the data at step 1030, the process moves to step 1034 where the data is captured.

At step 1036, a determination is made as to whether the implemented tracking method can use the captured image data. If the implemented tracking method can use the captured image data, the position of the device is determined at step 1038. Determination step 1038 may be made by the compound tracking device, the host computer, and/or some other device by the implemented tracking method from step 1004, 1014, or 1024. For this example, the compound tracking device makes the determination at step 1038. The process then proceeds to step 1046. If, at step 1036, the implemented tracking method cannot use the captured image, the process proceeds to step 1040.

At step 1040, the alternative tracking method is implemented. For example, if the user chose an absolute tracking method to be implemented in step 1002, at step 1040, the system implements the relative tracking method. Such a situation may occur when the underlying encoded pattern is obstructed and cannot be accurately identified by the absolute tracking system. At step 1042, the position of the compound tracking device is determined. The determination is made based upon the alternative tracking method now being implemented from step 1040. The process proceeds to step 1044, where the system returns back to the prior tracking method implemented in step 1030. The process continues to step 1046.

The determined position data is sent to the host computer at step 1046 and then used at step 1048 in an application running on or external to the host computer. The process moves to step 1050 where a determination is made as to whether there is more data to capture, e.g., whether the device has been moved. If there is more data to capture, the process returns to step 1030. If not, the process ends. It should be understood by those skilled in the art that the position data could be stored for later transmittal to the host and that the example process shown in FIG. 10 is but one example.

Figure 11A:
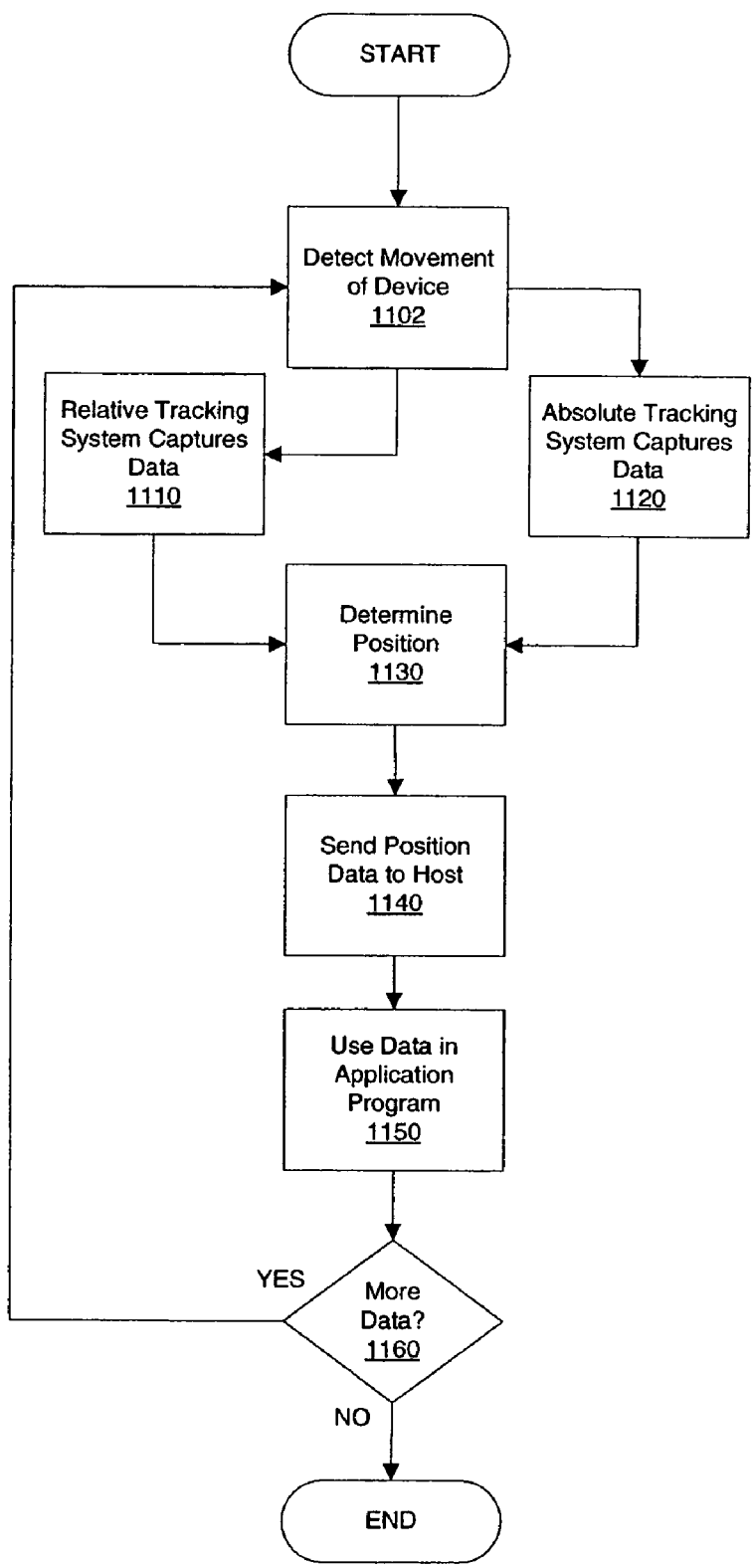
FIGS. 11A and 11B are flow charts of illustrative methods for tracking movement of a device in accordance with at least one aspect of the present invention.

FIG. 11A is a flow chart of another illustrative method for tracking movement of a device in accordance with at least one aspect of the present invention. The process starts and at step 1102, movement of the device is detected. Upon detection of movement, both the relative tracking system captures data in step 1110 and the absolute tracking system captures data in step 1120. The relative position data and absolute position data are then used, at step 1130, to determine the position of the device. Such an implementation may be used to generate precise position information. At step 1140, the position data is then sent to the host computer. At step 1150, the host computer uses the data for an application program running on or external to the host computer. The process moves to step 1160 where a determination is made as to whether more data needs to be captured. If more data needs to be captured, the process returns to step 1102. If not, the process ends. It should be understood by those skilled in the art that the position data may be stored in memory on the device before sending the position data to the host computer and that the example shown in FIG. 11A is but one example.

Figure 11B:
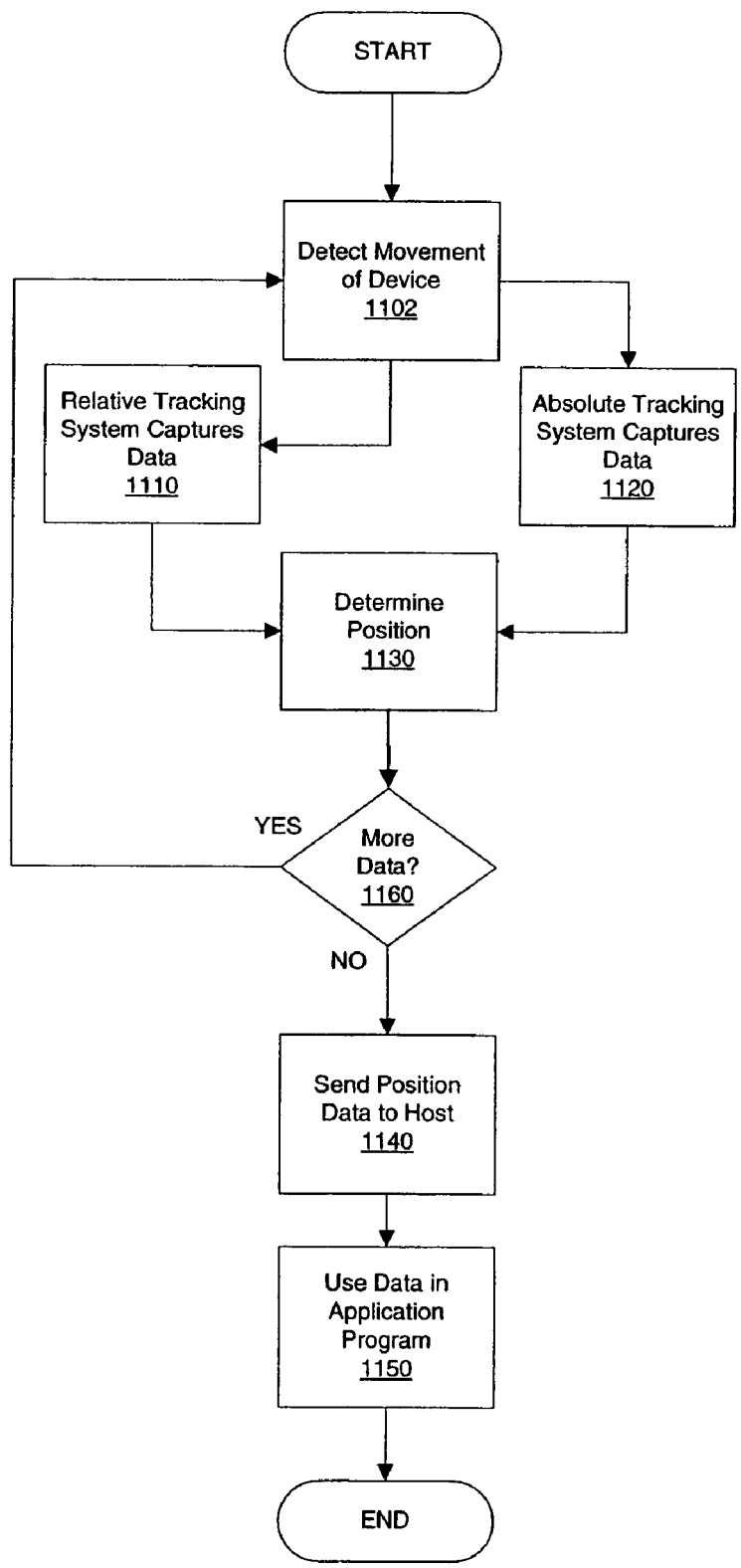

FIG. 11B is a flow chart of an alternative illustrative method for tracking movement of a device in accordance with at least one aspect of the present invention. This illustrative process may be implemented by an electronic pen-type computer input device. The process starts and at step 1102, movement of the device is detected. Upon detection of movement, both the relative tracking system captures data in step 1110 and the absolute tracking system captures data in step 1120. The relative position data and absolute position data are then used, at step 1130, to determine the position of the device. Such an implementation may be used to generate precise position information. The process moves to step 1160 where a determination is made as to whether more data needs to be captured. If more data needs to be captured, the process returns to step 1102. If not, the process proceeds to step 1140. At step 1140, the position data is then sent to the host computer. At step 1150, the host computer uses the data for an application program running on or external to the host computer. In such an example, a determined position data from step 1130 may be stored in a memory within the electronic pen-type computer input device until the data is sent to the host computer in step 1140. It should be understood by those skilled in the art that the position data may be stored in a memory in the device prior to transmission to the host computer.

Figure 12:
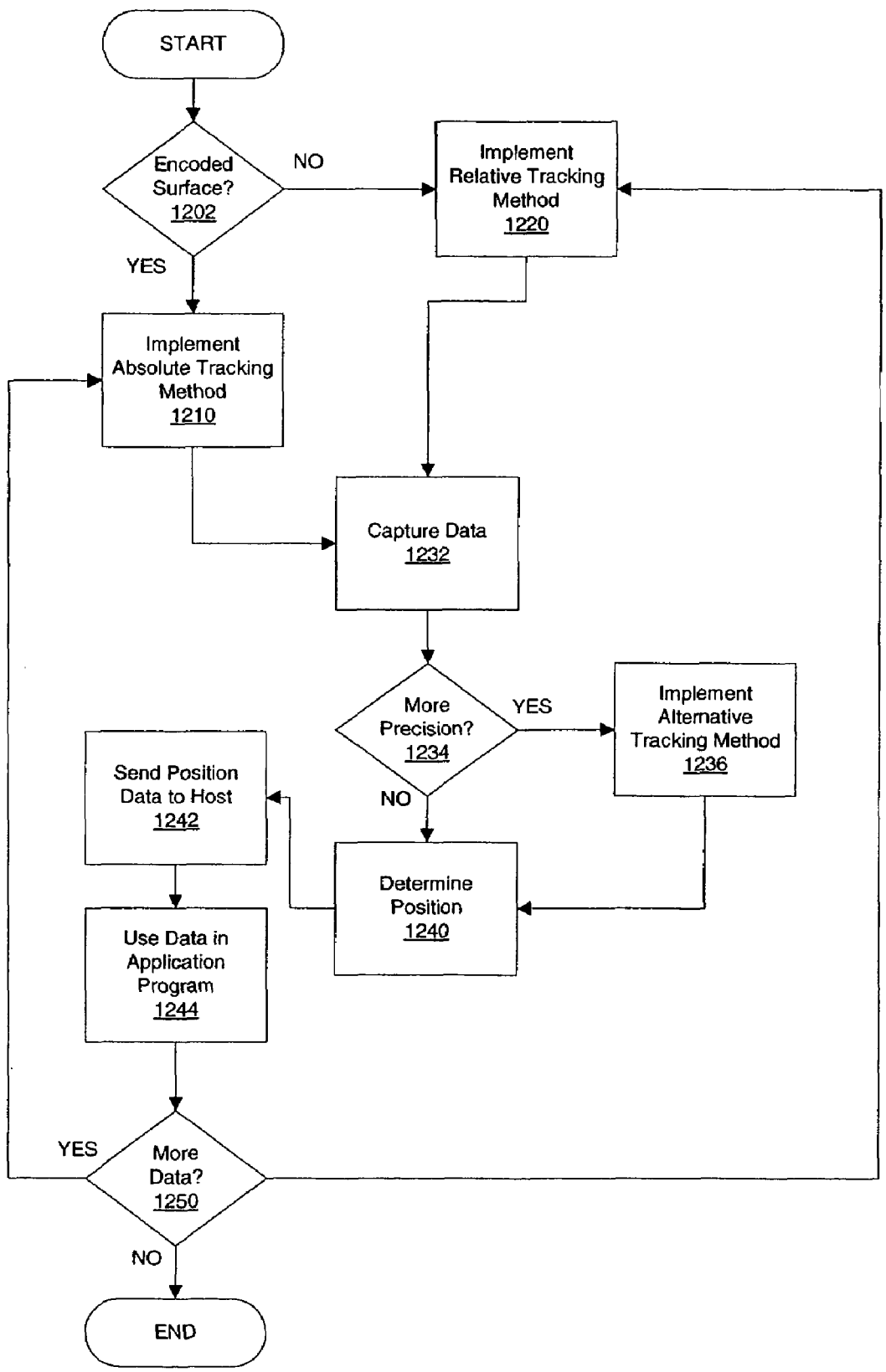
FIG. 12 is a flow chart of another illustrative method for tracking movement of a device in accordance with at least one aspect of the present invention.

FIG. 12 is a flow chart of another illustrative method for tracking movement of a device in accordance with at least one aspect of the present invention. The process starts and at step 1202, a determination is made as to whether the underlying surface being used with the device is an encoded surface. If the surface is encoded, the system implements an absolute tracking method at step 1210. If not, the system implements a relative tracking method at step 1220. In either situation, the process moves to step 1232. At step 1232, the sensor captures data.

At step 1234, a determination is made as to whether more precision is needed. Such a situation may arise when a user wishes to have a highly accurate representation of movement of the device. If more precision is needed, the alternative tracking method to the method implemented in step 1232 is selected in step 1236. If more precision is not needed, the process moves directly to step 1240. At step 1240, the position of the device is determined and the determined position data is sent to the host computer at step 1242. In another embodiment, the position data may be stored in memory on the device before sending it to the host computer. At step 1244, the position data is used in an application program running on or external to the host computer. The process continues to step 1250 where a determination is made as to whether there exists more data to capture. If more data exists, the process returns to step 1210 or 1220. If not, the process ends.

Figure 13:
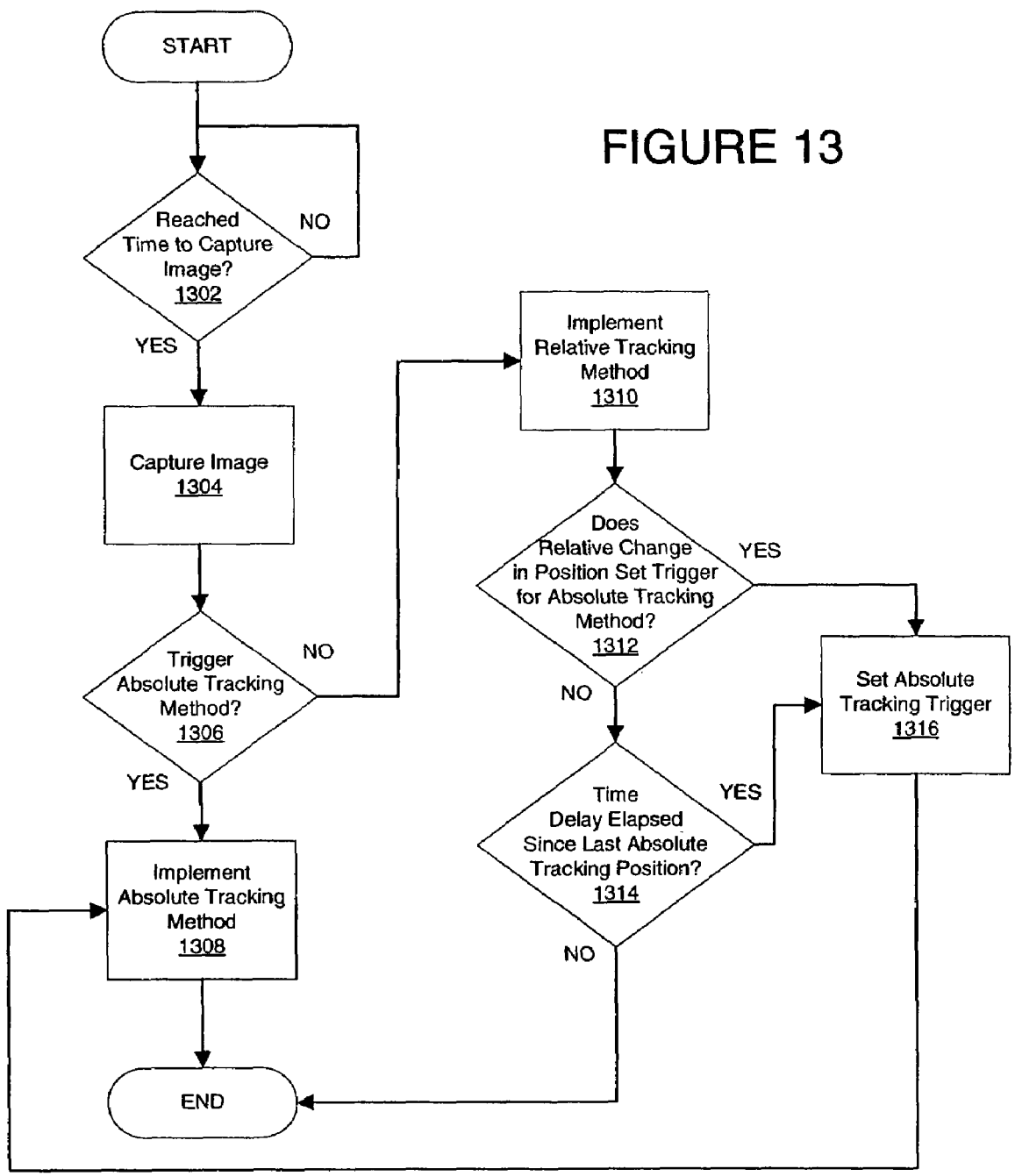
FIG. 13 is a flow chart of an illustrative method for tracking movement of a device in accordance with at least one aspect of the present invention.

FIG. 13 is a flow chart of another illustrative method for tracking movement of a device in accordance with at least one aspect of the present invention. The process starts and at step 1302, a determination is made as to whether a time has been reached to capture image data. The time may be a predetermined time and/or distance of movement of the device. If the time has not been reached, the process returns to step 1302. If the time has been reached, the process moves to step 1304. At step 1304, image data is captured.

At step 1306, a determination is made as to whether the absolute tracking method has been triggered. Such a situation may arise when the movement of the device has reached a predetermined distance and/or a predetermined amount of time has passed. If the absolute tracking method has been triggered in step 1306, the process moves to step 1308, where the absolute tracking method is implemented. If the absolute tracking method has not been triggered at step 1306, the process proceeds to step 1310.

At step 1310, the relative tracking method is implemented on the captured image data. At step 1312, a determination is made as to whether the relative change in position of the device set a trigger for the absolute tracking method. If the relative change in position does set a trigger, the process proceeds to step 1316 where a trigger for the absolute tracking method is set. The process then returns to step 1308. If the relative change in position of the device does not set a trigger, the process proceeds to step 1314. At step 1314, a determination is made as to whether a predetermined time delay and/or distance has elapsed since the last absolute tracking position has been determined. If the time delay has elapsed, the process proceeds to step 1316 where a trigger for the absolute tracking method is set. If not, the process ends.

In one embodiment, the relative tracking subsystem is only implemented when there is an insufficient visible watermark pattern portion to effectively decode an absolute position. The relative tracking subsystem is then implemented when the control system determines the position data from the absolute subsystem is inadequate and/or missing. In another embodiment, the relative tracking subsystem may require less time for processing captured data than the absolute subsystem. Under such a condition, the relative tracking subsystem may be utilized for the majority of data collection, while the absolute tracking subsystem provides periodic waypoints for error correction. In yet another embodiment, the absolute tracking subsystem and the underlying watermark pattern provide coarse path information and the relative tracking subsystem interpolates additional path information to provide more positional precision.

Data from each of the subsystems provides useful information to ease processing in the other. For example, orientation, in systems with multiple degrees of freedom, data calculated by the absolute tracking subsystem may be used to reduce processing load in the relative tracking subsystem. Similarly, anticipated position data from the relative tracking subsystem may allow for better initial condition estimates and more limited processing requirements in the decoding of the absolute position.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for tracking movement of a device, the method comprising steps of:

implementing a relative tracking subsystem for tracking positions of the device on a surface;

determining whether to implement an absolute tracking subsystem for tracking positions of the device on the surface;

implementing the absolute tracking subsystem in response to determining to implement the absolute tracking subsystem;

capturing data corresponding to a location of the device on the surface; and determining a position of the device on the surface based on the captured data, wherein determining whether to implement the absolute tracking subsystem is based upon determinations of whether the first relative tracking subsystem has been operated for a predetermined time and whether movement of the device along the surface has reached a predetermined distance.

2. The method of claim 1, further comprising a step of transmitting the position of the device to a computer.

3. The method of claim 2, further comprising a step of applying the position of the device as an input to an application operating on the computer.

4. The method of claim 3, wherein the application determines a cursor position.

5. The method of claim 4, further comprising a step of displaying the cursor position on a display responsive to the applying step.

6. The method of claim 1, further comprising a step of determining whether the position of the device has changed.

7. The method of claim 1, wherein the step of determining the position of the device with reference to the surface is based on the implemented relative tracking subsystem.

8. The method of claim 1, wherein the step of determining the position of the device with reference to the surface is based on the implemented absolute tracking subsystem.

9. The method of claim 1, wherein the step of determining the position of the device with reference to the surface is based on the implemented relative and absolute tracking subsystems.

10. The method of claim 1, wherein the relative tracking subsystem is a default tracking subsystem.

11. The method of claim 1, upon determining to implement the absolute tracking subsystem, the method further comprising a step of disabling implementation of the relative tracking subsystem, wherein the step of determining the position of the device with reference to the surface is based on the implemented absolute tracking subsystem.

12. The method of claim 1, further comprising a step of transmitting the captured data to a computer, wherein the step of determining the position of the device with reference to the surface is performed by the computer.

13. The method of claim 1, further comprising a step of comparing the efficiency of the relative tracking subsystem to the absolute tracking subsystem.

14. The method of claim 13, wherein the step of comparing the efficiency of the relative tracking subsystem to the absolute tracking subsystem is based on a setting.

15. The method of claim 1, wherein the step of determining whether to implement the absolute tracking subsystem includes determining whether the relative tracking subsystem has failed to track the position of the device.

16. The method of claim 15, wherein the relative tracking subsystem has failed to track the position of the device when the data corresponding to the location on the surface is missing or occluded.

17. The method of claim 1, wherein the step of capturing data includes steps of:
outputting a light from the device;
capturing a portion of data encoded upon the surface; and
decoding the encoded data.

18. The method of claim 17, wherein the encoded data includes position data and additional data.

19. The method of claim 17, wherein the surface is a watermark surface.

20. The method of claim 1, further comprising a step of storing the captured data in a memory.

21. The method of claim 20, wherein the memory is located within the device.

22. The method of claim 20, wherein the device is an electronic pen-type device.

23. The method of claim 1, wherein the step of determining whether to implement the absolute tracking subsystem includes a step of triggering the absolute tracking subsystem to implement responsive to data captured by the relative tracking subsystem.

24. A computer-readable medium having computer-executable instructions for performing the steps of claim 1.

25. A system for tracking movement of a device, the system comprising:
a device, the device including:
a sensor, configured to capture data corresponding to a position of the device, and
a relative tracking subsystem, configured to receive the captured data and output determined position data of the device; and
a host computer including an absolute tracking subsystem, the absolute tracking subsystem configured to output representative position data,
wherein the absolute tracking subsystem is configured to output representative position data after the relative tracking subsystem has been operated for a predetermined time and after the movement of the device along the surface has reached a predetermined distance,
wherein the host computer is in communication with the device and is configured to receive the determined position data, to compute representative position data of the device, and to apply the representative position data as an input to an application.

26. The system of claim 25, wherein the host computer is configured to compute the representative position data based on the received determined position data.

27. The system of claim 25, wherein the device is a handheld device.

28. The system of claim 25, wherein the device is an electronic pen-type device.

* * * * *